United States Patent
Chivukula et al.

(10) Patent No.: US 11,880,360 B2
(45) Date of Patent: Jan. 23, 2024

(54) TRANSFORMING DATA IN DEVOPS LANDSCAPE

(71) Applicant: Opsera Inc, San Jose, CA (US)

(72) Inventors: Ravi Kumar Chivukula, San Jose, CA (US); Chandra Ranganathan, San Jose, CA (US); Vasanthavishnu Vasudevan, Phoenix, AZ (US); Sundar Rajan Renganathan, Chennai (IN); Tejas Bharadwaj, Union City, CA (US); Shrey Malhotra, Sunnyvale, CA (US); Venkat Yuvraj, Fremont, CA (US); Phani Sree Harsha Pullabhatlapogada, Fremont, CA (US); Kishore Rajan, Chennai (IN)

(73) Assignee: Opsera Inc., San Jose, CA (US)

(*) Notice: Subject to any disclaimer, the term of this patent is extended or adjusted under 35 U.S.C. 154(b) by 181 days.

(21) Appl. No.: 17/355,853

(22) Filed: Jun. 23, 2021

(65) Prior Publication Data

US 2022/0308865 A1    Sep. 29, 2022

Related U.S. Application Data

(60) Provisional application No. 63/164,905, filed on Mar. 23, 2021.

(51) Int. Cl.
*G06F 16/245* (2019.01)
*G06F 16/248* (2019.01)
(Continued)

(52) U.S. Cl.
CPC .......... *G06F 16/245* (2019.01); *G06F 3/0482* (2013.01); *G06F 3/0486* (2013.01);
(Continued)

(58) Field of Classification Search
None
See application file for complete search history.

(56) References Cited

U.S. PATENT DOCUMENTS 10,534,912 B1 * 1/2020 Youngberg ........... G06F 21/577
11,567,735 B1 * 1/2023 Kulkarni ................ G06N 20/00
(Continued)

OTHER PUBLICATIONS

Martinez-Fernandez et al., "Towards Automated Data Integration in Software Analytics," Aug. 16, 2018, arXiv:1808.05376v1. (Year: 2018).*

*Primary Examiner* — Andrew M. Lyons
(74) *Attorney, Agent, or Firm* — David R. Stevens; Stevens Law Group

(57) ABSTRACT

The present invention extends to methods, systems, and computer program products for deriving unified insights ad logs from DevOps CI/CD tools and pipeline data. In general, a data transformer facilitates data normalization and serialization converting raw data across multiple DevOps tools and stores the data into a Data Lake in accordance with a customized schema. A continuous orchestrator sequences, aggregates and contextualizes the logs, providing an intuitive way of troubleshooting issues across a DevOps environment, historical data for compliance and audit purposes, and a build manifest for root cause analysis. The continuous orchestrator also processes the logs and leverages a KPI framework, providing intelligent dashboards across 90+ KPI's and a plurality of different dimensions (Planning, Development/pipelines, security, quality, operations, productivity and source code) to help customers make smart decisions and do more with less.

19 Claims, 16 Drawing Sheets

(51) Int. Cl.
      *G06F 3/0482*      (2013.01)
      *G06F 3/0486*      (2013.01)
      *G06F 8/77*      (2018.01)
      *G06F 8/35*      (2018.01)
      *G06F 8/71*      (2018.01)
      *G06F 11/34*      (2006.01)
      *G06Q 10/0637*      (2023.01)
      *G06F 9/50*      (2006.01)
      *G06Q 10/101*      (2023.01)
      *H04L 67/133*      (2022.01)
      *G06F 8/10*      (2018.01)

(52) U.S. Cl.
      CPC ............... *G06F 8/10* (2013.01); *G06F 8/35* (2013.01); *G06F 8/71* (2013.01); *G06F 8/77* (2013.01); *G06F 9/5005* (2013.01); *G06F 11/3438* (2013.01); *G06F 16/248* (2019.01); *G06Q 10/0637* (2013.01); *G06Q 10/101* (2013.01); *H04L 67/133* (2022.05)

(56) References Cited

U.S. PATENT DOCUMENTS

| | | | |
|---|---|---|---|
| 2017/0109379 A1* | 4/2017 | Crawford | G06F 11/3072 |
| 2017/0185396 A1* | 6/2017 | Todd | G06F 8/60 |
| 2017/0237778 A1* | 8/2017 | DiGiambattista | H04L 63/1433 |
| | | | 726/1 |
| 2019/0213105 A1* | 7/2019 | Jose | G06F 8/427 |
| 2020/0241872 A1* | 7/2020 | Muddakkagari | G06F 16/903 |
| 2022/0222079 A1* | 7/2022 | Vergara | G06F 9/5072 |

\* cited by examiner

TRANSFORMING DATA IN DEVOPS LANDSCAPE

RELATED APPLICATIONS

This application claims the benefit of U.S. Provisional Application Ser. No. 63/164,905 entitled "Unified Insights Across DevOps Landscape" and filed Mar. 23, 2021, which is hereby incorporated herein by reference in its entirety

TECHNICAL FIELD

The present disclosure relates generally to deriving unified insights, KPIs, and metrics from DevOps data. Aspects include analyzing DevOps platform and pipeline data.

BACKGROUND

In general, analytics is the computation analysis of data or statistics. Analytics can be used for discovery, interpretation, and communication of meaningful data patterns. Analytics also includes applying data patterns towards effective decision making. In some environments, analytics can be used to quantity performance of software programs, networks, etc. For example, organizations may apply analytics to business data to describe, predict, and improve business performance. Analytics results can be presented via dashboard widgets, rollup bars, counts, reports, etc. In some environments users can customize analytics results (at least to some extent).

Software analytics is more specific to the domain of software systems taking into account source code, static and dynamic characteristics (e.g., software metrics) as well as related processes of their development and evolution. It aims at describing, monitoring, predicting, and improving efficiency and effectivity of software engineering throughout the software lifecycle, in particular during software development and software maintenance. The data collection is typically done by mining software repositories, but can also be achieved by collecting user actions or production data. One avenue for using the collected data is to augment the integrated development environments (IDEs) with data-driven features.

DevOps represents a change in IT culture, focusing on rapid software and information technology service delivery through the adoption of agile, lean practices in the context of a system-oriented approach. DevOps emphasizes people (and culture), and it seeks to improve collaboration between operations and development teams. DevOps implementations utilize technology—especially automation tools that can leverage an increasingly programmable and dynamic infrastructure from a life cycle perspective. As such, DevOps can be utilized to shorten systems development lifecycle, improve the ability to provide continuous software delivery and help improve quality and security posture.

In general, a platform is an environment in which program code is executed. The environment can include hardware, operating system, associated programming interfaces, and other underlying software. With respect to DevOps, a DevOps platform provides an environment for creating and executing DevOps pipelines. A DevOps pipeline can include a set or combination of interconnected tools, also referred to as a "toolchain", that aids in the delivery, development, and management of digital resources (e.g., software) throughout the development life cycle. DevOps tools can fit into one or more categories supporting DevOps initiatives, such as, for example, plan, create, verify, package, test, release, configure, monitor, validate, version control, and security.

Appropriately configured and executed DevOps platforms and pipelines add some level of automation to digital resource (e.g., software) development and deployment, increasing agility. However, configuring and executing DevOps platforms and pipelines often includes many manual processes and can require both significant time (e.g., weeks and potentially even months) and human resources to complete. For example, DevOps platform configuration can include manually provisioning and allocating various hardware, network, and storage resources from a cloud provider. DevOps pipeline creation and execution can include manually managing tool interactions with platform resources and between various tools. In some aspects, human resources are expended to generate "glue code" (e.g., custom code, custom scripts and manual integration) that connects and promotes appropriate interoperation between different tools in a pipeline/toolchain.

Further, many platform and pipeline environments/providers restrict platforms to prescribed resource configurations and/or functionality, limit flexibility by preventing customers from selecting their own choice of tools, and do not offer out of the box or native integration to the toolchain to customers.

Analytics on data or statistics from DevOps platforms and pipelines also has a number of challenges. Different tools and components can use different and potentially incompatible data types. Further, there may be no clear definition of the relevance of different log data types that are to be used to discovery, interpret and communicate meaningful data patterns or quantify performance DevOps performance. Tools can also run on different computing resources in different locations creating diversity among log data. Using diverse log data can make it more difficult to derive meaningful predictions about quality, planning, productivity, security, compliance, and operations. Additionally, different log data may be of interest to different personas, applications, products, projects, sprints, or releases. However, identifying relevant log data across one or more of those dimensions can also be difficult.

BRIEF DESCRIPTION OF THE DRAWINGS

The specific features, aspects and advantages of the present invention will become better understood with regard to the following description and accompanying drawings where.

DETAILED DESCRIPTION

Figure 1:
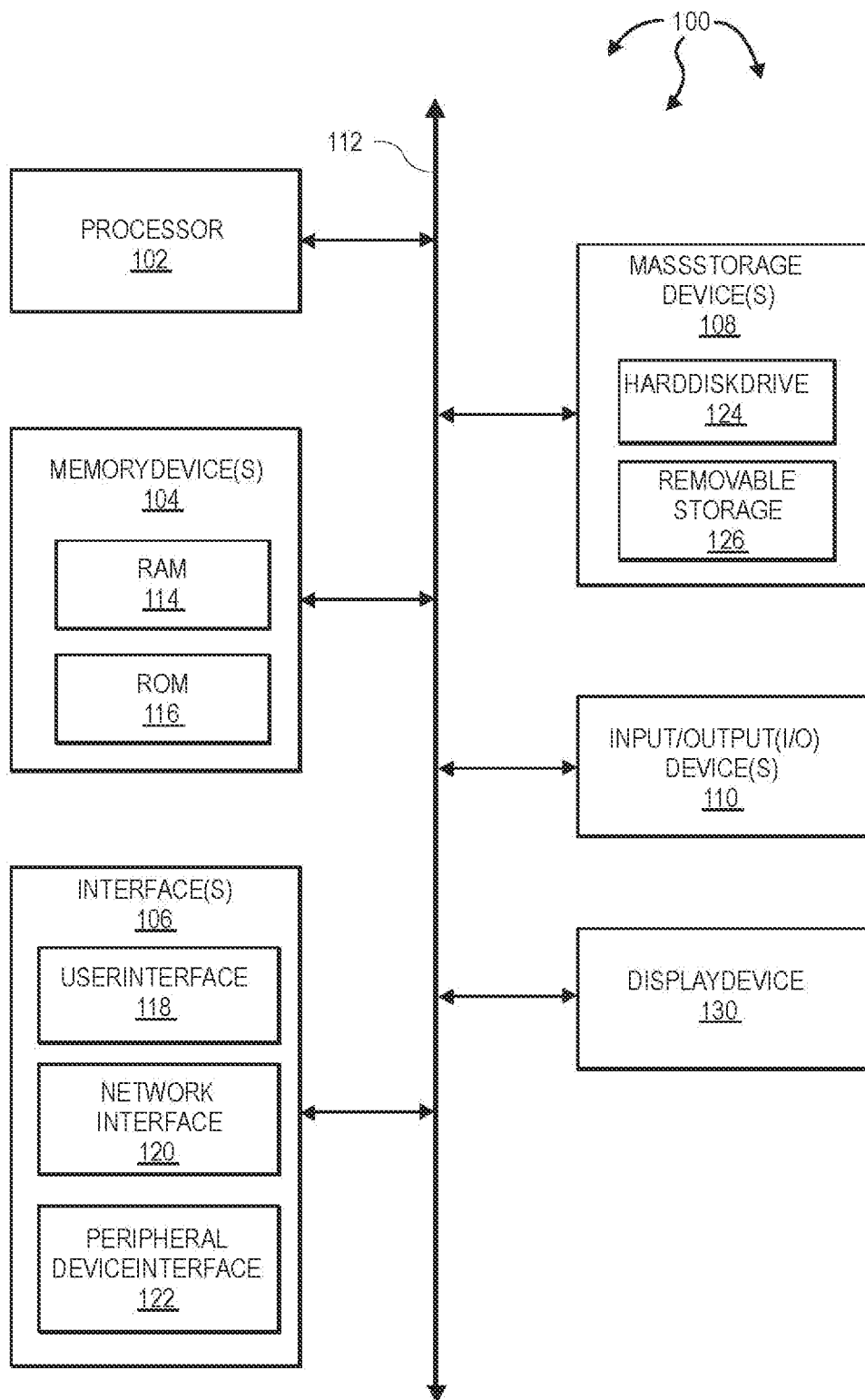
FIG. 1 illustrates an example block diagram of a computing device.

The present invention extends to methods, systems, and computer program products for deriving insights from DevOps data, such as, from various DevOps tools, pipelines, or logs.

Unified insights and logs can be integrated with DevOps tool chain automation and integrated with declarative pipelines to provide more comprehensive solutions. DevOps continuous orchestration can provide a variety of benefits with respect to declarative pipelines. DevOps continuous orchestration enables users to build the Continuous Integration/Continuous Development (CI/CD) declarative pipelines using drag and drop techniques. Users can build the pipelines/workflows across various DevOps stages, tools, and various cloud environments. DevOps stages can include code commit, software builds, security scans, vault integration, approvals, notifications, thresholds and gates, quality testing integrations, validation, integrating with change control and monitoring tools, deployment and providing a view of activity logs across every stage, etc. Users can also leverage continuous integration to build pipelines across Software Development Life Cycle (SDLC), Kubernetes, multilanguage pipelines, Infrastructure as a Code (IaC), Salesforce platform, Artificial intelligence, and Machine learning platform, ServiceNow, and workday platforms.

DevOps Continuous orchestration can also provide a variety of benefits with respect to unified insights and logs. A data transformer operates as a data normalization and serialization engine, converting raw data across a DevOps environment and tools. The data transformer can store normalized/serialized data in a data lake in accordance with a platform provider customized schema. DevOps continuous orchestration can then sequence, aggregate, and contextualize logs and provide an intuitive way of troubleshooting issues across a DevOps environment. As such, users can use unified insights and logs to capture historical data for compliance and audit purposes and provide a build manifest for root cause analysis. DevOps continuous orchestration can also process logs and leverage a Key Performance Indicator (KPI) framework. DevOps continuous integration can provide an intelligent dashboard across any of number of (e.g., 85+) KPI's and any of a number of different (e.g., six or more) dimensions (including planning, Development/ pipelines, security, quality, operations, and source code) to the customers. The intelligent dashboard can help users make more informed decisions and do more with less.

Aspects of the invention include data transformation, performing analytics operations on standardized analytics data, aggregating data in accordance with build manifests, deriving predictive insights from log data, performing persona-based analytics operations, and determining a computing environment posture level.

Analysis can be focused on understanding the past, for example, what happened and why it happened. Analytics, on the other hand, can be focused on why things happened and what is more likely to happen in the future.

Turning to FIG. 1, FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, radars, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Transforming Data

A data transformer can operate as a data normalization and serialization engine that converts raw data (e.g., from a data lake) into a specified schema that can subsequently be used for analytics. The data transformer facilitates converting raw (e.g., log data) data into calculated metric values. Query processing time for query data can be reduced from a presentation layer by reducing the number of calculations. The data transformer can also significantly reduce, if not eliminate, malformed data from entering analytics systems.

Accordingly, a data transformer can normalize data by, for example, converting raw (e.g., log) data into a standardized (e.g., pipeline) schema. The data transformer can calculate and store metric level data such that the query time from the presentation layer can be reduced. The data transformer can aggregate and normalize data providing a contextual view to customers. The contextual view helps customers improve the mean time to resolution (MTTR) and operational excellence. Also, helps the customers to use the historical data to satisfy compliance and audit requirements. The data transformer also helps categorize step level data and group that data in order to create pipeline level data through a conglomeration of step level data.

The data transformer can be built using a loosely coupled architecture. The data transformer can connect to existing customer/user DevOps ecosystems and/or be integrated into managed DevOps environment. Through a customer/user DevOps ecosystem or a managed environment the data transformer facilitates providing unified insights and logs to help customers to make intelligent decisions. For example, the data transformer can be included in an analytics system that integrates business objectives and key results (OKRs) with DevOps Key Performance Indicators (KPIs). As such, the data transformer can facilitate providing value stream management metrics for organizations to better understand the value of work that the engineering, developers and operations are contributing against organization strategy.

A data lake can be a centralized landing point for raw (e.g., log) data collected across various users, tools, platforms, and pipelines. Using scalable and dynamic index management, the data lake can segregate raw data into respective indices which can be searched and queried through the data transformer. The data lake can store raw and untouched data preserved for audit and compliance purposes.

A flexible schema model can wrap stages that run as part of a pipeline into a standard data model. The flexible schema model allows an analytics system to more effectively index and store log data. As such, the data can be used in other analytics features, for example, Build Manifest and KPI's. Standardizing a log structure of various stages, the flexible schema model can be utilized to reduce correlation time the queries that feed KPI's. The flexible schema model also helps link tool level data to a Pipeline Runs enabling advanced correlation.

The flexible schema model facilitates standardized storage of tool level data into a pipeline level correlated schema. The flexible schema model also helps prevent malformed data from being ingested reducing the possibly of breaking an analytics flow.

The flexible schema model can be segregated into at least three separated collections, step summary data, pipeline summary data, and external collection. Step summary data stores step level pipeline run data along with any tool specific data associated with a pipeline run. Pipeline summary data is a grouped collection of step summary data for a pipeline run. External collection helps standardize the data model for tools that are not part of a pipeline run. The flexible schema model uses data subnesting with top level identifiers, which helps route queries to relevant sub nested data.

A real time query processor allows for metrics to be displayed with limited delay in updating visualizations in an analytics module. The metrics can relate to various categories including planning, development, security, operations, etc. that span hundreds of KPIs. The real time query processor allows users to track metrics across multiple categories in a real time manner. For example, a user can track progress of their running pipelines and capture tool activity logs (code scans, unit tests, build, testing, vulnerability management, functional and performance testing, deployment, approvals, etc.) in real-time. The real-time query processor allows users to see the results of their daily operations as they occur, so that if there any issues or anomalies in the activity, they can be more quickly identified and resolved. The real-time query processor can also provide end to end view of code commit to code deploy.

The real-time query processor can provide information to users relatively quickly. For example, data can be correlated and contextualized and corresponding visualization processed in essentially real-time. Visualizations can be targeted to developers, managers, and executive personas.

Figure 2:
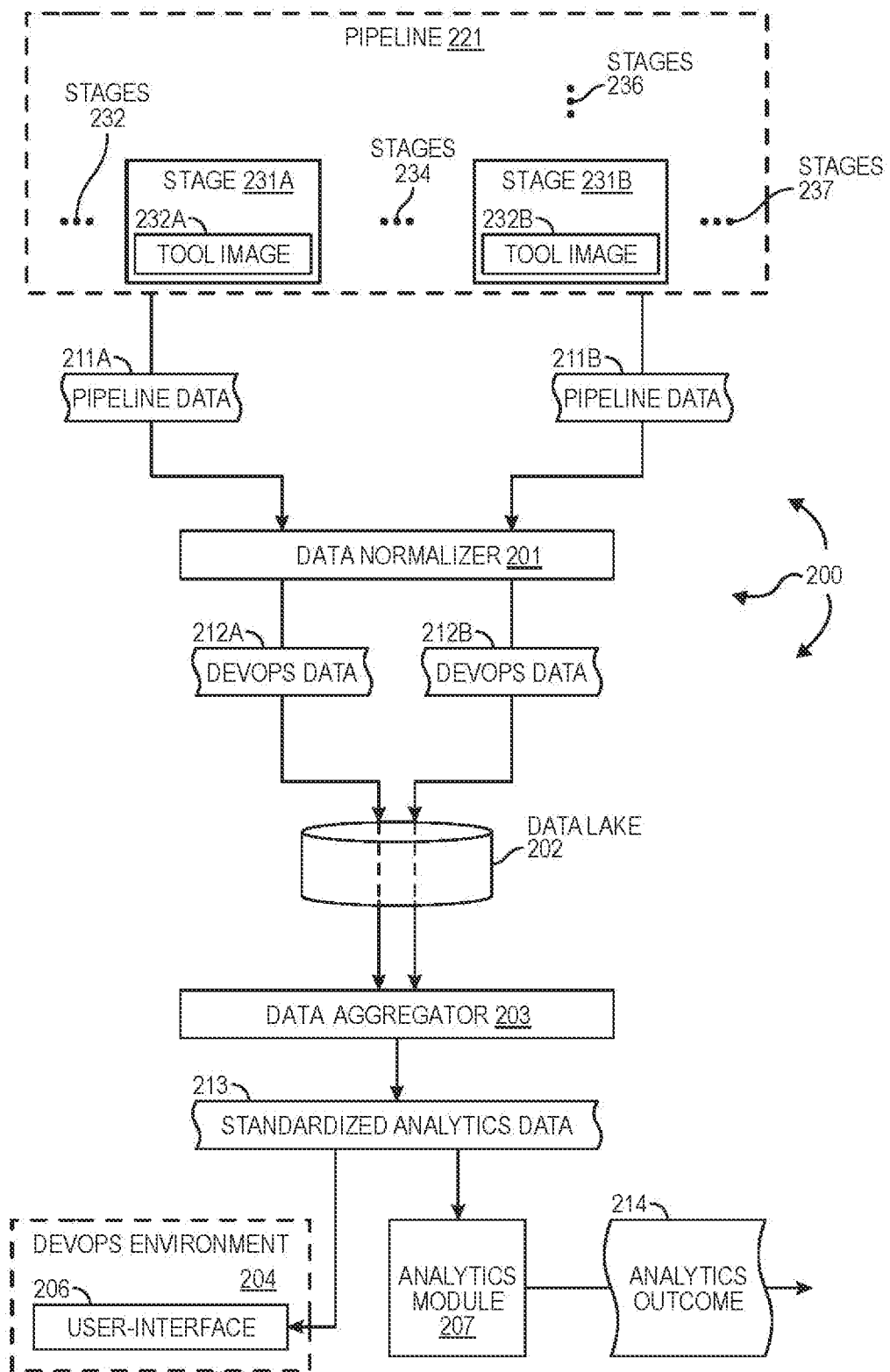
FIG. 2 illustrates an example computer architecture that facilitates performing an analytics operation on standardized analytics data.

FIG. 2 illustrates an example computer architecture 200 that facilitates performing an analytics operation on standardized analytics data.

As depicted, computer architecture 200 includes pipeline 221, data normalizer 201, data lake 202, data aggregator 203, DevOps environment 204, and analytics module 207. DevOps environment 204 further includes user-interface 206.

Pipeline 211 can include a plurality of stages including stages 231A and 231B. One or more stages 233 can precede stage 231A. One or more stages 234 can be between stages 231A and 2331B. One or more stages 237 can follow stage 231B. One or more stages 236 can operate in parallel with one or more of stages 231A, 231B, 233, 234, and 237. Each stage can include a tool image. For example, stages 231A and 231B include tool images 232A and 232B respectively.

Figure 3:
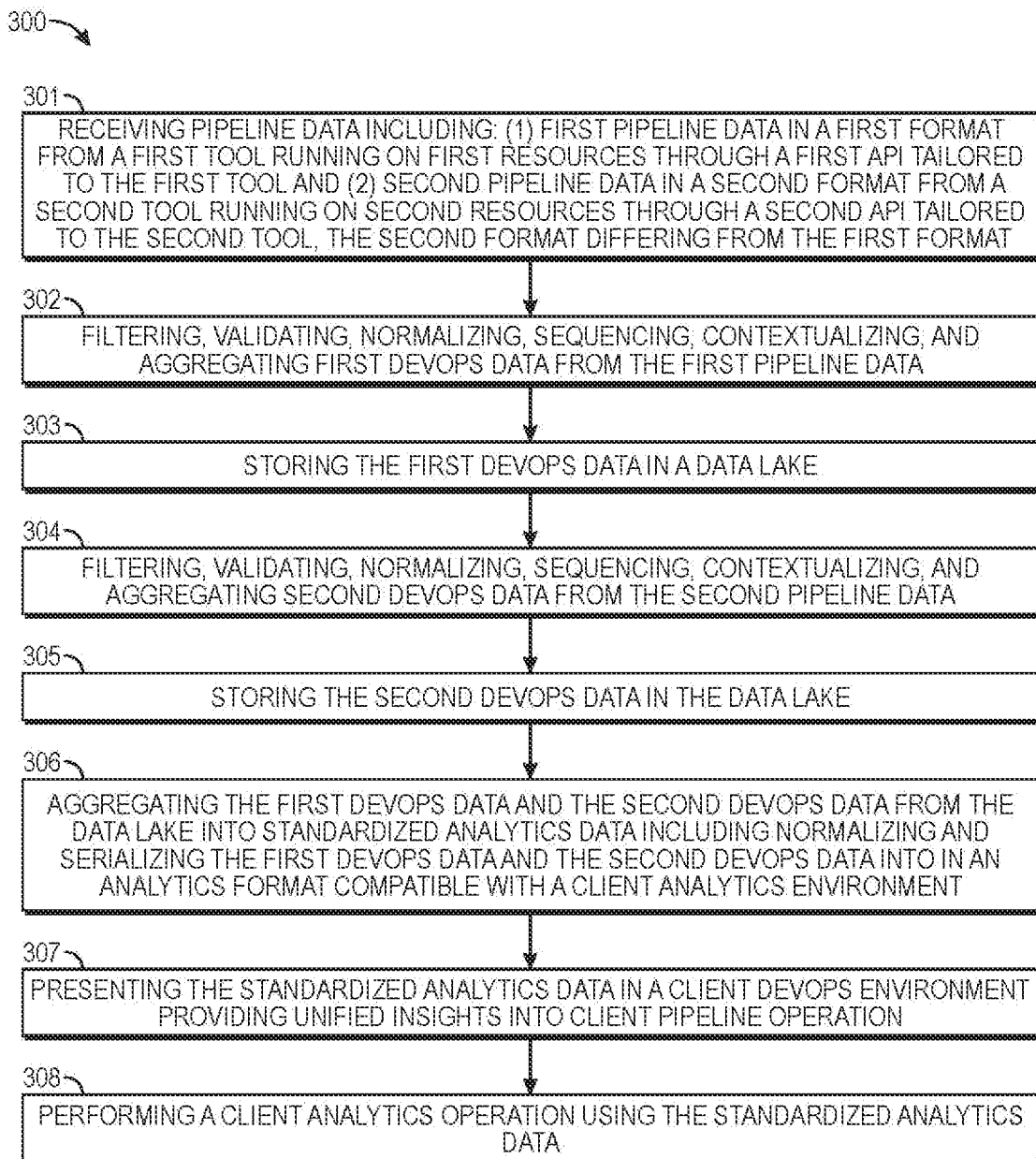
FIG. 3 illustrates a flow chart of an example method for performing an analytics operation on standardized analytics data.

FIG. 3 illustrates a flow chart of an example method 300 for performing an analytics operation on standardized analytics data. Method 300 will be described with respect to the components and data in computer architecture 200.

Method 300 includes receiving pipeline data including: (1) first pipeline data in a first format from a first tool running on first resources through a first API tailored to the first tool and (2) second pipeline data in a second format from a second tool running on second resources through a second API tailored to the second tool, the second format differing from the first format (301). For example, tool image 232A can generate pipeline data 211A and tool image 232B can generate pipeline data 211B. Data normalizer 201 can access pipeline data 211A through a first tailored API and can access pipeline data 211B from pipeline 221 through a second tailored API.

In another aspect, data normalizer receives first pipeline data associated with a first pipeline and second pipeline data associated with a second pipeline. The first pipeline and second pipeline can run serially or in parallel. The first pipeline and the second pipeline can have a parent child relationship. For example, the first pipeline can be a parent pipeline and the second pipeline a child pipeline of the first pipeline or vice versa.

Tools (whether in the same pipeline or different pipelines) can run on a combination of cloud resources and/or on-premise resources. Data normalizer 201 can access pipeline data from tools run on a combination of cloud resources and/or on-premise resources.

Method 300 includes filtering, validating, normalizing, sequencing, contextualizing, and aggregating first DevOps data from the first pipeline data (302). For example, data normalizer 201 can filter, validate, normalize, sequence, contextualize, and aggregate DevOps data 212A from pipeline data 211A. Method 300 includes storing the first DevOps data in a data lake (303). For example, data normalizer 201 can store DevOps data 212A in data lake 202.

Method 300 includes filtering, validating, normalizing, sequencing, contextualizing, and aggregating second DevOps data from the second pipeline data (304). For example, data normalizer 201 can filter, validate, normalize, sequence, contextualize, and aggregate DevOps data 212B from pipeline data 211B. Method 300 includes storing the second DevOps data in the data lake (305). For example, data normalizer 201 can store DevOps data 212B in data lake 202.

In one aspect, the first DevOps data is the first pipeline data and the second DevOps data is the second pipeline data.

Method 300 includes aggregating the first DevOps data and the second DevOps data from the data lake into standardized analytics data including normalizing and serializing the first DevOps data and the second DevOps data into an analytics format compatible with a client analytics environment (306). For example, data aggregator 203 can aggregate DevOps data 212A and DevOps data 212B into standardized analytics data 213 (in a format compatible with DevOps environment 204). Aggregation can include normalizing and serializing DevOps data 212A and DevOps data 212B in standardized analytics data 213.

In one aspect, data aggregator 203 converts the first pipeline data and the second pipeline data in accordance with a standardized pipeline schema. Converting the first pipeline data and the second pipeline data can include converting the first pipeline data and the second pipeline data into calculated metric values.

Method 300 includes presenting the standardized analytics data in a client DevOps environment providing unified insights into client pipeline operation (307). For example, DevOps environment 204 can present standardized analytics data 213 at user-interface 206 providing an insight into operation of pipeline 221. In one aspect, a unified insight is an insight with respect to how one or more pipelines (e.g., including pipeline 221) are performing against one or more audit requirements. Presenting standardized analytics data 213 can include presenting the standardized analytics data by one or more of: product, application, release, project, spring, or family of products at a dashboard or log.

Method 300 includes performing a client analytics operation using the standardized analytics data (308). For example, analytics module 207 can perform a client analytics operation using standardized analytics data 213 and generating analytics outcome 214. In one aspect, analytics module 207 uses standardized analytics data 213 to satisfy one or more of: security, compliance or audit requirements across a DevOps lifecycle. Using standardized analytics data 213 can include crawling standardized analytics data 213.

A client analytics operation can include/indicate one or more of: engineering contribution value to a client strategy, developer contribution value to the client strategy, or operations contribution value to the client strategy. A client analytics operation can include evaluating a security posture of one or more tools, such as, for example, tool image 232A and/or tool image 232B, using KPIs. KPIs cam span multiple dimensions including planning, pipeline, security, quality, operations, source code, and customer success.

In one aspect, a client can use tool chain automation to declare pipeline 221 including tool images 232A and 232B. Data normalizer 201 can then access (client) pipeline data 211A and pipeline data 211B from the declared pipeline. As depicted, the components of computer architecture 200 can be connected to DevOps environment 204. DevOps environment 204 can be a client DevOps environment of the client that declared pipeline 221.

Build Manifest Based Analytics

A build manifest can facilitate unique log analysis. Logs can be provided each action for automated and manual tasks performed by tools and system included in pipeline. Build manifests can be automated and stored (e.g., sent to an S3 bucket or in Jira ticket or as an PDF) for later use. Build manifests can be used for audit and compliance purposes and also for troubleshooting purposes during and after the pipeline deployment.

Using a build manifest, Development and Operations teams can view system/tool logs for each action without the need to login to any DevOps tools part of the pipeline. Development, Operations and engineering teams often have to login to multiple tools (15+) on average to fetch and correlate logs. Build manifests eliminate the need of logging into each tool or console and enable and empower teams to get the aggregated logs and consume them in near real-time via a self-service portal. The logs can be received direction from tools/pipelines without alteration allowing the logs to be used for audit and compliance purposes. Using build manifests, users can set up notifications and create tickets in Information Technology Service Management (ITSM) tools in a proactive way rather than being reactive. Build Manifests can also facilitate pattern modelling, providing insights to Developers and operations team on system performance or notify them about the change in pattern on the pipeline.

In general, actionable insights can be derived from any type of raw data as part of the Pipeline, including Salesforce dot com (SFDC), Software Development Lifecycle (SDLC), Package Deployments, Database Deployments, Infrastructure Provisioning, Infrastructure Deployments, Multi-Language pipelines, Infrastructure as a Code (IaC), serverless application deployment, Kubernetes application deployment, Artificial Intelligence/Machine Learning (AI/ML) pipelines, etc. Actionable insights can provide contextualization and insights to executives to managers and developers/operations team on how well their DevOps ecosystem is working right from Planning to production deployment with minimal (and possibly zero) coding.

Actionable insights provide insights to a Developer's code quality, bugs, security issues, TVM's to developers, operations, quality and security team on the fly during pipeline execution. Actionable insights can be used to create actionable tickets in ITSM for a team to resolve and track as part of a next pipeline execution. Actionable insights can be trigged based on the thresholds set up by the DevOps team or based on the pipeline pattern. Actionable insights can be used to predict a pipeline using the previous pipeline builds and provide insights and also provide a value to business and executives on the code quality and bugs that can be expected.

Notifications allow users to receive alerts on the pipeline activity for complete, on error, or on all activity in the pipeline. Notifications also allow users to build approval notifications for the pipeline for approval or denial status. Users can set notifications for specific logs that need to be monitored as part of a pipeline or analytics module to prevent any incidents or failures. Notifications can be sent via email, Slack, HipChat, Microsoft Teams or as an SMS.

Notifications can be configured in API connectors such that a managing system can look for any notification configuration and trigger the notifications based on the information available in a managing system DB. Notifications can be toggled to off incase notification for part of pipeline or analytics is not desired or inappropriate. Notifications can be set to any stage of the pipeline or KPI's or analytics or logs to a specific group or independent person. Notifications can be set to any alerts based on the keywords or thresholds in infrastructure/pipeline tools.

Users can set up thresholds or gates for the pipeline or analytics so that an orchestrator makes decisions and notifies users of thresholds breach. Pipeline can be stopped in case there is a breach in the thresholds set up at each stage of the pipeline around build, quality, security, compliance and deployment and application performance KPI's. In case of analytics/KPI's, if the quality or security or Deploy KPI's breach a KPI threshold, a notification hub can notify the owners to take corrective action to stop the breach and can provide remediation information. Thresholds can be overridden by having an exception approval stage from a manager or executive.

Figure 4:
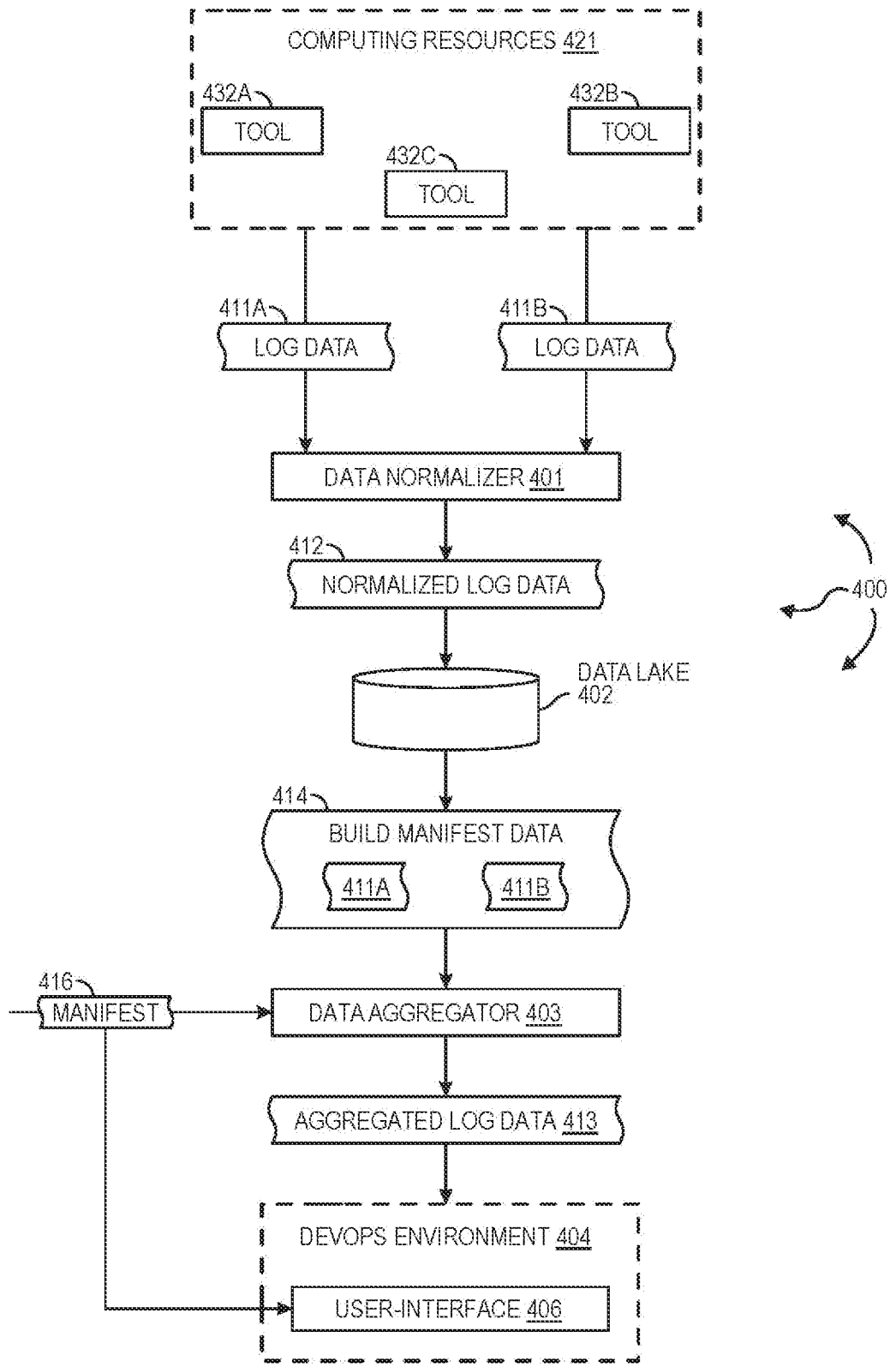
FIG. 4 illustrates an example computer architecture that facilitates aggregating data in accordance with a build manifest.

FIG. 4 illustrates an example computer architecture 400 that facilitates aggregating data in accordance with a build manifest.

As depicted, computer architecture 400 includes computing resources 421, data normalizer 401, data lake 402, data aggregator 403, and DevOps environment 404. DevOps environment 404 further includes user-interface 406. Tools 432A, 432B, and 432C are running on computing resources 421 and may be included in one or more pipeline stages. Computing resources 421 can be a combination of one or more on-premise resources and/or one or more cloud resources.

Figure 5:
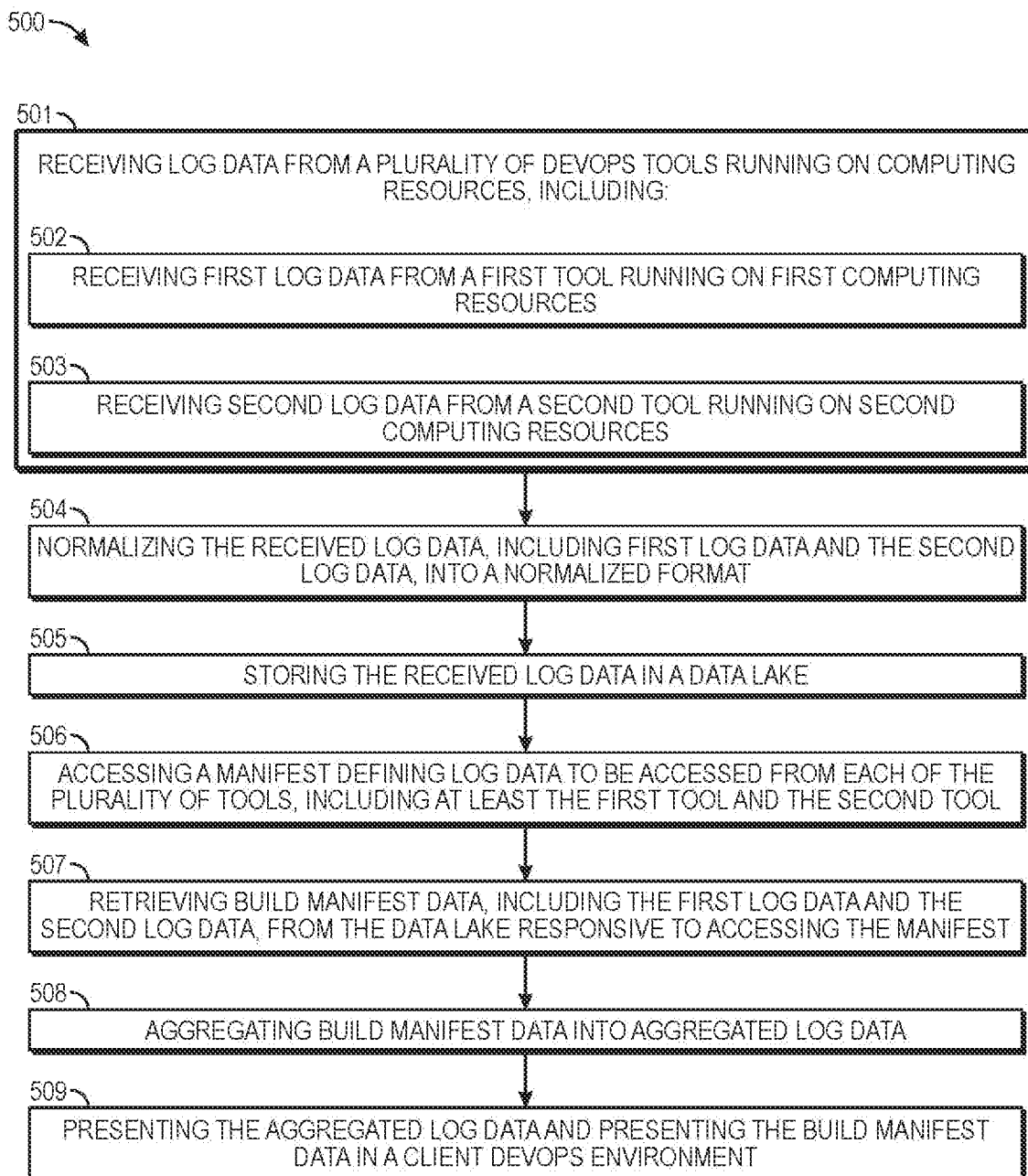
FIG. 5 illustrates a flow chart of an example method for aggregating data in accordance with a build manifest.

FIG. 5 illustrates a flow chart of an example method 500 for aggregating data in accordance with a build manifest. Method 500 will be described with respect to the components and data in computer architecture 400.

Method 500 includes receiving log data from a plurality of DevOps tools running on computing resources (501). For example, data normalizer 401 can receive log data from two or more of tools 432A, 432B, and 432C. In one aspect, computing resources 421 include pipeline resources and tools 432A, 432B, and 432C run as part of one or more pipelines or pipeline stages on the pipeline resources. Pipelines (or stages thereof) can run serially or in parallel and can include parent/child relationships. Tools (whether in the same pipeline or different pipelines) can run on a combination of cloud resources and/or on-premise resources. Data normalizer 401 can access pipeline data from tools run on a combination of cloud resources and/or on-premise resources.

Receiving log data from a plurality of DevOps tools running on computing resources includes receiving first log data from a first tool running on first computing resources (502). For example, data normalizer 401 can receive log data 411A from tool 432A. Receiving log data from a plurality of DevOps tools running on computing resources includes receiving second log data from a second tool running on second computing resources (503). For example, data normalizer 401 can receive log data 411B from tool 432B.

Method 500 includes normalizing the received log data, including first log data and the second log data, into a normalized format (504). For example, data normalizer 401 can normalize log data 411A and log data 411B into normalized log data 412. Method 500 includes storing the received log data in a data lake (505). For example, data normalizer 401 can store normalized log data 412 in data lake 402.

Method 500 includes accessing a manifest defining log data to be accessed from each of the plurality of tools, including at least the first tool and the second tool (506). For example, data aggregator 403 can access manifest 416. Manifest 416 can define log data of interest, for example, log data from a defined plurality of tools, to be accessed from data lake 402. Log data of interest can be defined by one or more of: a pipeline identifier, a build identifier, a product, a sprint, a project, etc. In some aspects, log data of interest is defined via one or more filters indicating log data view granularities.

Method 500 includes retrieving building manifest data, including the first log data and the second log data, from the data lake responsive to accessing the manifest (507). For example, data aggregator 403 can access build manifest data 414, including log data 411A and log data 411B, from data lake 402 in accordance with manifest 416.

Method 500 includes aggregating build manifest data into aggregated log data (508). For example, data aggregator 403 can aggregate build manifest data 414, including log data 411A and 411B, into aggregated log data 413. In one aspect, data aggregator 403 also sequences aggregated log data 413, for example, by pipeline stage of one or more pipelines, into sequenced log data.

In one aspect, data aggregator 403 aggregates log data 411A and log data 411B into aggregated log data 403. Data aggregation can include indexing log data 411A and log data 411B by the one or more of: a pipeline identifier, a build identifier, a product, a sprint, or a project.

Method 500 includes presenting the aggregated log data and presenting the build manifest data in a client DevOps environment (509). For example, DevOps environment 404 can present aggregated log data 413 and build manifest 416 at user-interface 406. If log data was previously sequenced, DevOps environment 404 can present the sequenced log data at user-interface 406.

Presenting aggregated log data can include uploading the aggregated log data to ITSM tools, such as, Jira, Servicenow, etc. Presenting aggregated log data can also include sharing the aggregated log data via a collaboration tool, such as, Slack, email, MS teams, etc. Presenting aggregated log data can further include sharing the aggregated log data with or security requesting one or more of: a review or an approval.

Predictive Analytics and Pattern Modeling

Pattern modeling can be used to create models providing predictive insights to customers regarding their user patterns, tools patterns, pipelines/operations metadata. Using tracked pattern data, a data transformer streams metadata and constructs a data streaming model giving predictive trends/insights across users, tools, pipelines, operations and planning insights. Insights can be relatively complex and provide meaningful analysis of a customer's systems across dimensions including security, quality, compliance, operations, etc.

In one aspect, a data pattern modeler can use classification algorithms and data from various security tools (e.g., static code analysis, dynamic code analysis, Threat and vulnerability scans etc.) to derive a predictive insights model. The predictive insights model can provide score cards right from planning, development, user actions and infrastructure metadata collected as part of pipeline or tool execution. In another aspect, a data pattern modeler can use data classification algorithms and data from various quality categories (e.g., unit testing, functional, API based, Web services, Non functional testing, etc.) to derive a predictive insights model. The predictive insights model can provide score cards right from planning, development, user actions (manual vs automation) metadata collected as part of pipeline or tool execution and provide the rate of quality through predictive insights.

Data classification algorithms from the commit can be utilized to provide metrics including the rate of commit, frequency of failures, success, average build duration. Metrics can be separated by user/by project/by organization from collected pipeline metadata. Using pipeline metadata reports can be generated for different personas wherein changes can be implemented to prevent issues or failures.

Insights into DevOps tools rationalization based on the usage, compliance and security issues can be provided to assist with controlling DevOps cost around tooling and infrastructure. Insights can include recommendations based on planning, Software development, Quality, Security, Operations can be provided to users to improve their system/tools and application performance across releases. Recommendations can also be based on the number of tools being used, number of applications using the tools, number of users using the tool. Recommendations assist with root cause analysis of pipeline issues and predict failures before they occur. Insights can indicate when and in what particular scenario a high or critical error is triggered in infrastructure or application during the application deployment flow.

Insight scorecards associated with quality, security, compliance, development, etc. can be formulated from log data. Scorecards can include:

Quality:
1. Unit Testing: Tests for individual functions or chunks of code
2. Integration Testing: Tests to ensure new code doesn't damage existing functionality
3. Functional Testing: Tests to ensure code is functioning how intended Security:
1. Static code analysis: Analysis for vulnerabilities in code that may leave the application susceptible to hacking
2. Container Security: Policies and rules that provide access control to containers to protect infrastructure privacy and security
3. Dynamic code analysis: Analysis for vulnerabilities in code that may leave the application susceptible to hacking during the run time
4. CIS Benchmarks: CIS benchmark policies will be tracked against NIST and provide a security scorecard around infrastructure, cluster and container management.

Figure 6:
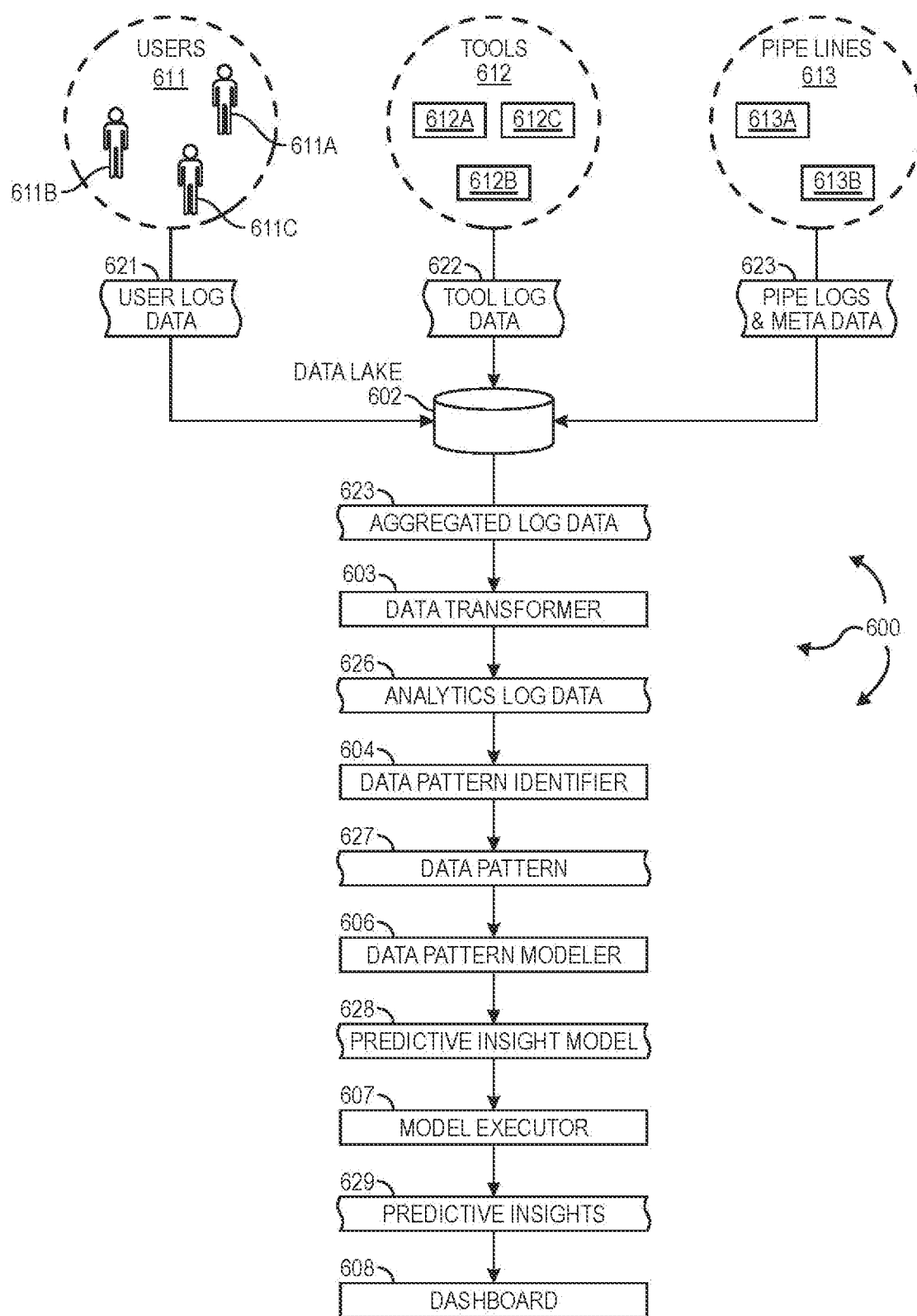
FIG. 6 illustrates an example computer architecture that facilitates deriving a predictive insight from log data.

Compliance:
1. Incident Management: How well a system would be able to withstand incident (disaster recovery, mean time to resolve)
2. Deployment Efficiency: How frequently deployments occur, adjusted for issues with deployments Development:
1. Development Efficiency: A measure of how quickly code is developed (adjusted for errors in the code) and committed from Development environment to QA/Production environments. (Lead Time for Changes)
2. Resource Management: A measure of how efficiently developers are being used (how much/frequently they commit code
3. Provide predictive scorecards and trends on the Manual (bottleneck) process KPI's/trends around merge request, commit time, Issues created vs resolved, active contributors, number of features that can be developed across different application teams, technologies etc.
4. Provide Predictive insights on time taken of maintenance code checking vs net new code for a new feature FIG. 6 illustrates an example computer architecture 600 that facilitates deriving a predictive insight from log data. As depicted, computer architecture 600 includes computing users 611, tools 612, pipelines 613, data lake 602, data transformer 603, data pattern identifier 604, data pattern modeler 606, model executor 607, dashboard 608, and storage 641. Users 611 further include 611A, 611b, and 611C. Tools 612 further include tools 612A, 612B, and 612C. Pipelines 613 further include pipelines 613A and 613B. One or more of tools 612A, 612B, and 612C can be included in stages of pipelines 613, such as, stages of pipelines 613A, 613B, etc.

Figure 7:
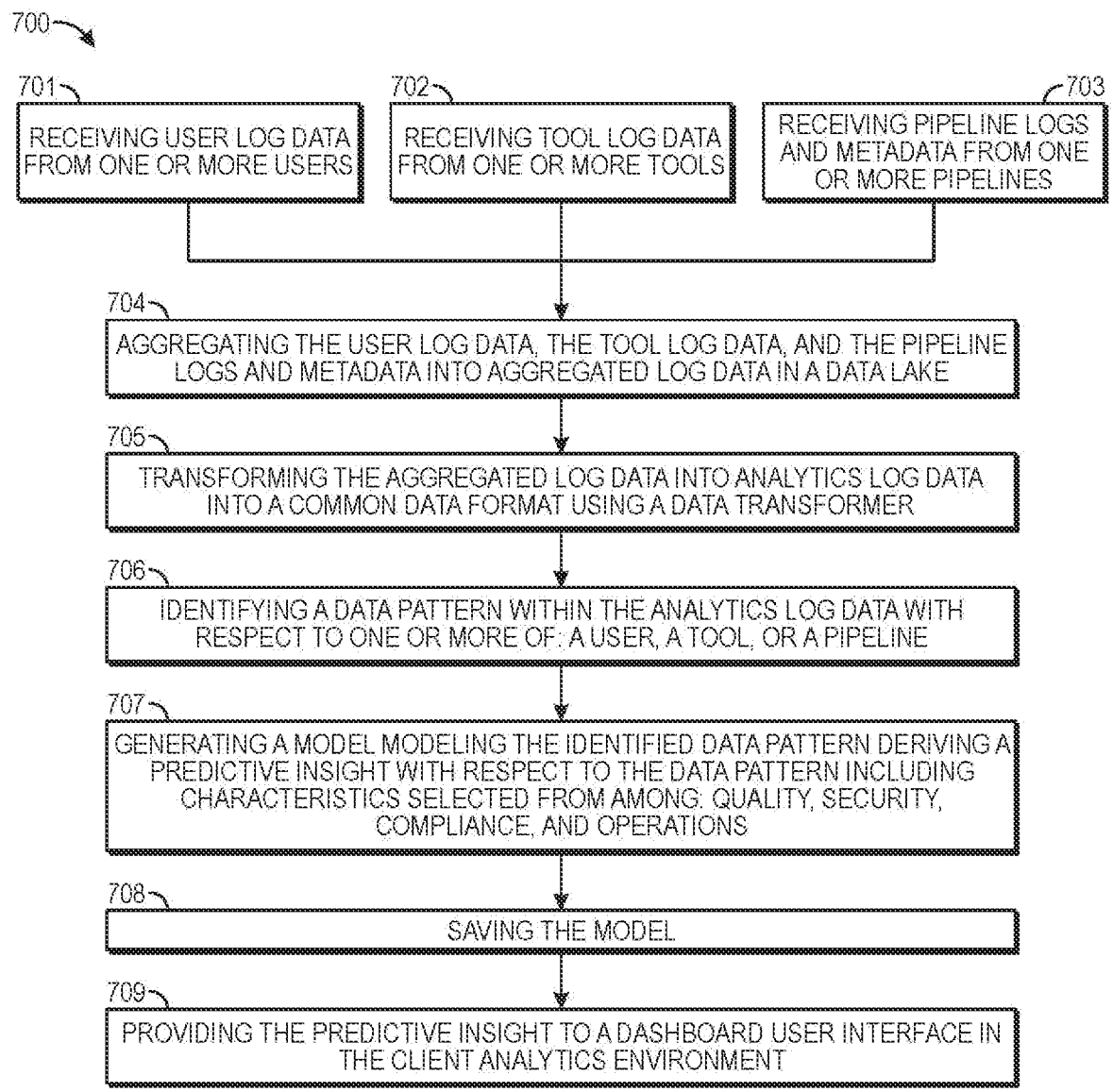
FIG. 7 illustrates a flow chart of an example method for deriving a predictive insight from log data.

FIG. 7 illustrates a flow chart of an example method 700 for deriving a predictive insight from log data. Method 700 will be described with respect to the components and data in computer architecture 600.

Method 700 includes receiving user log data from one or more users (701). For example, data lake 602 can receive user log data 621 from users 611. User log data 621 can include log data from each of users 611A, 611B, 611C, etc.

Method 700 includes receiving tool log data from one or more tools (702). For example, data lake 602 can receive user tool log data 621 from users 612. User log data 622 can include log data from each of users 612A, 612B, 612C, etc. Receiving log data from one or more tools can include receiving log data from a plurality of tools running on pipeline resources of one or more pipeline stages. Pipeline resources can include cloud resources and/or on-premise resources.

Method 700 includes receiving pipeline logs and metadata from one or more pipelines (703). For example, data lake 602 can receive pipeline logs and metadata 623 from pipelines 613. Pipeline logs and metadata 623 can include log and metadata from each of pipelines 613A, 613B, etc.

In one aspect, various tools 612 run as part of one or more pipelines 613 or as part of one or more stages of pipelines 613. The various tools 612 can run on pipeline resources. Pipelines 613 (or stages thereof) can run serially or in parallel and include parent/child relationships. Tools 612 (whether in the same pipeline or different pipelines) can run on a combination of cloud resources and/or on-premise resources. Data lake 602 can access pipeline logs and metadata from tools running on a combination of cloud resources and/or on-premise resources.

Method 700 includes aggregating the user log data, the tool log data, and the pipeline logs and metadata into aggregated log data in a data lake (704). For example, a data aggregator can aggregate user log data 621, tool log data 622, and pipeline logs and metadata 623 into aggregated log data 623 in data lake 602.

Method 700 includes transforming the aggregated log data into analytics log data into a common data format using a data transformer (705). For example, data transformer 603 can transform aggregated log data 623 into analytics log data 626. Analytics log data 623 can be in a data format common to and/or compatible with other modules of computer architecture 600.

Method 700 includes identifying a data pattern within the analytics log data with respect to one or more of: a user, a tool, or a pipeline (706). For example, data pattern identifier 604 can identify data pattern 627 from analytics log data 626. The data pattern can relate to one or more of: a user included in users 611, a tool included in tools 612, or a pipeline included in pipelines 613.

Method 700 includes generating a model modeling the identified data pattern deriving a predictive insight with respect to the data pattern including characteristics selected from among: quality, security, compliance, and operations (707). For example, data pattern modeler 606 can generate predictive insight model 628 from data pattern 627. Predictive insight model 628 can derive a predictive insight with respect to data pattern 627 across one or more dimensions selected from among: quality, security, compliance, operations, etc.

In one aspect, deriving a predictive insight includes deriving a recommendation to improve pipeline stage operation based on the first tool, the second tool, and the aggregated log data. In another aspect, deriving a predictive insight includes deriving a root cause of an issue with a pipeline stage or deriving a prediction of a possible failure in a pipelines stage.

In a further aspect, deriving a predictive insight includes identifying one or more of: a pipeline stage vulnerability, a pipeline stage bug, or a pipeline stage issue and deriving a recommendation to fix the one or more of: the pipeline stage vulnerability, the pipeline stage bug, or the pipeline stage issue.

Method 700 includes saving the model (708). For example, data pattern modeler 606 can save predictive insight model 628 at storage 641.

Method 700 includes providing the predictive insight to a dashboard user interface in the client analytics environment (709). For example, model executor 607 can execute predictive insight model 628 deriving predictive insights 629. Model executor 607 can provide predictive insights 629 at dashboard 608. Dashboard 608 can be part of a DevOps environment, a quality assurance (QA) environment, a production environment, a pre-production environment, a pipeline stage environment, or a User Acceptance Testing (UAT) environment.

Persona Based Analytics

Personas facilitate user-oriented communication within and between teams in the organization. Personas help focus design decisions on user goals and needs rather than on system attributes and features. An objective of personas is to empower users to communicate research data within a team. Utilizing empathy-based data helps users to see the world from the customer's perspective. Without personas, organizations risk creating a one-size-fits-all design expected to suit many different users. The ability to manipulate and control every process, event, tool, and so on from one place, rather than logging in and out of different platforms and rationalizing data from different sources, can significantly simplify DevOps process.

An analytics dashboard can be a data and persona driven visualization page to bring teams closer together. Based on informed metrics tracking and a (e.g., relatively detailed) customer map, a customer is empowered to make more informed decisions with respect to design changes, new/ updated features, and onboarding strategy. As data volume increases, understanding online analytics numbers and relating them to key performance indicators can be challenging. In a single pane of glass, appropriate data can be collected and viewed, including value stream health status, performance of tool chain orchestration, tool chain activities/ exceptions, DevOps reports and analytics, traceability, etc. By managing the DevOps lifecycle with value stream metrics, managers can compare similar value streams across a common set of key performance indicators (KPIs) to determine DevOps efforts success.

Personas based data crystallizes specific user types, including focusing on core users in the absence of an immediate contact to the end user. KPIs and Metrics can be contextualized from unstructured data into structured data based on the Customer role and access. Queries can be customized across a plurality of dimensions including Planning, Pipeline, Quality, Security, Operations. Persona based analytics can also be used to help uncover patterns of use and trends in behavior that would otherwise be masked when lumping together the data for multiple visitors to a site.

Persona based predictive analytics and data mining, help customers understand current patterns data and predict future outcomes. Aligning contextualized based value metrics to personas helps ensure that revenue expands right along with the customer's value. Top level executives tend to want to make long-term decisions about business strategy. Persona based predictive analytics can show how business is performing, trends that are occurring over time, KPIs and indicators, that assist with executive decision making.

Persona based predictive analytics facilitate true autonomy among individuals and DevOps team members and Facilitate cross-functional collaboration, reducing waste and bottlenecked processes. Persona based predictive analytics also facilitate continuous flow across SFDC pipelines (e.g., Continuous Integration (CI) and/or Continuous Development (CD)), SDLC pipelines, Package Deployments, Database Deployments, Infrastructure Provisioning, Infrastructure Deployments, Multi-Language pipelines, Infrastructure as a Code (IaC), serverless application deployment, Kubernetes application deployment, AI/ML pipelines, etc., including integration, testing, deployment and even funding, among others.

Utilizing personas can predict the needs, behavior and possible reactions of users, that is why they can reduce the use of the usability exam. Personas can help product teams figure out the more important design elements. Personas can be used to: (1) combine numbers and human attributes to create dynamic, more accurate, and continually updated data-driven persona profiles, (2) turn abstract concept of User into a person with thoughts and emotions, (3) represent a group of users with similar goals and characteristics, (4) help a provider get to users more closely to create better experiences.

Connected user personas, stories and maps that rally a team around the needs and goals of real-world users can be created. Users can be maintained at the forefront of design decisions, and can be particularly helpful in securing buy-in from key stakeholders by putting a face and a name to the needs and pain points your design solutions address. Using visual tools helps crate and organize work to gain greater visibility. DevOps reports can be tailored to people at multiple/different levels of the organization, who may or may not have in-depth technical knowledge.

There is a number of beneficial uses associated with persona-based analytics, including:

Take the data, segment it by the personas mentioned above, and analyze the differences and similarities.

Aggregated KPIs across Continuous Integration and Continuous development toolchain for a single view.

Measure Approval gates, accountable owners and updates for faster resolution and improved auditing and compliance.

Identify, detect, and eventually predict trends and behavior by persona Understand different groups of user interactions.

Gather quantifiable data—Identify, detect, and eventually predict trends and behavior by users.

Normalize the technology stack—Help users to normalize their tech stacks by eliminating redundant systems, perhaps refactoring applications to work on a smaller set of operating systems.

Help customers to Identify Homegrown tools and services that don't follow any common industry standards and lack common interfaces.

More flexibility for development staff to work on different applications, services or components thereby minimizing the technical ramp up time.

Reduced surface area for security vulnerabilities

Individuals can make changes without significant wait times

Conducting a security review for all major features while ensuring that the security review process does not slow down development.

Testing security requirements as a part of the automated testing process.

Persona-based analytics can be designed across multiple dimensions (including Planning, Development, Security, Operations) of DevOps evolution. Practices in each dimension help customers achieve success and progress to the next phase of DevOps journey. Customers can view personal based charts for the installed tools and services.

Design can implement the following principles:

Flexible—Flexible enough to perform end-end orchestration using Customized filters like Projects, Features, Releases, Contextualized Key Performance Indicators on any given time. Custom driven real-time queries which can be exported can speed up in identifying warnings and errors for specific tools, users.

Predict and Prevent—AI driven intelligent charts can help find anomalies and recommend fixes and suggestions providing clear visibility for accountable owners.

Inbuilt Security—Inbuilt security and quality gates that can trigger notifications for preventive measures. Details could also be identified by applying, or removing, certain filters.

In one aspect, a Modular, loosely coupled, microservices and container-based architecture is used. Also, a data transformer, real time query processor, and DB schema can be used (e.g., as described in the "Data Transformation" section of this application).

Figure 8:
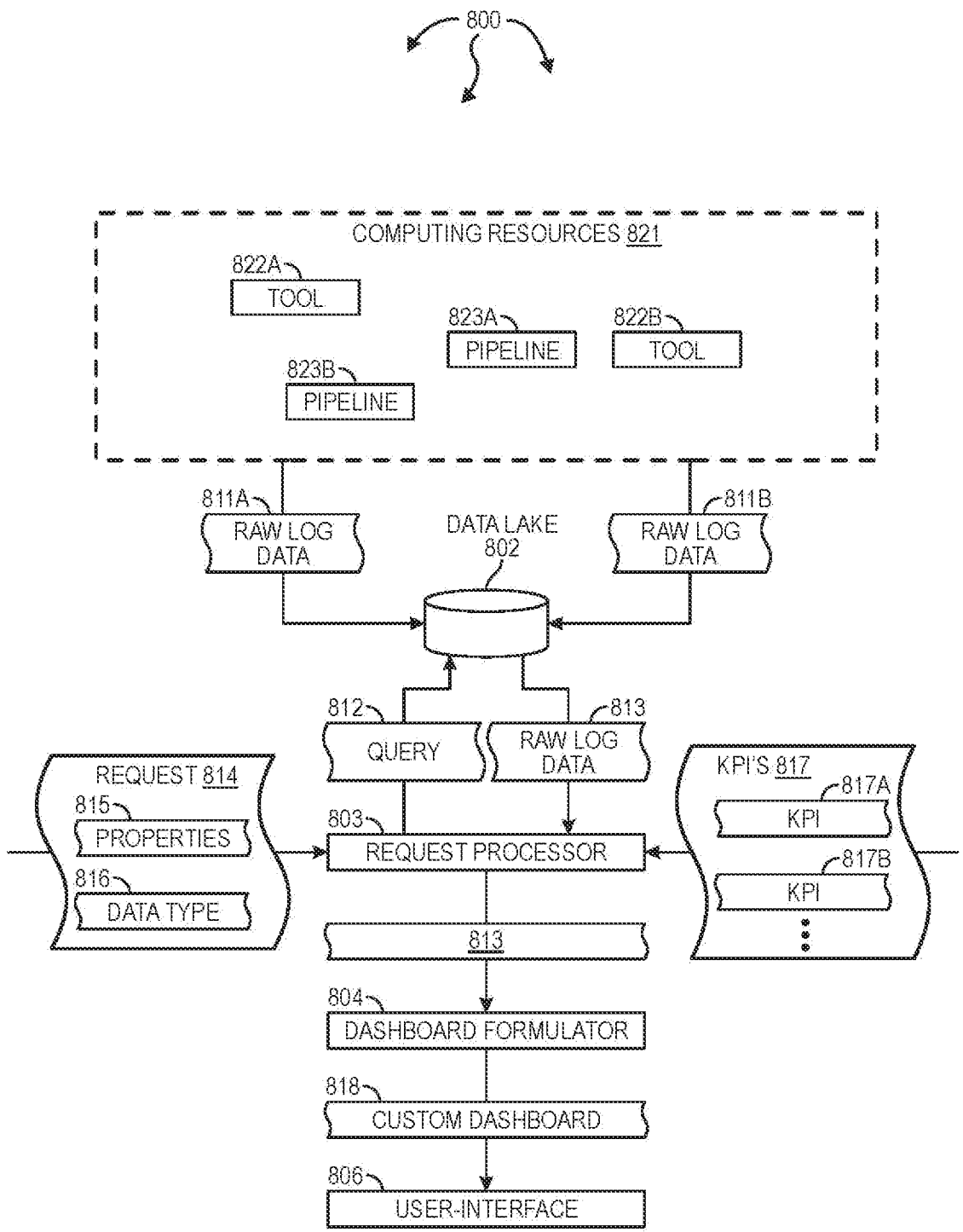
FIG. 8 illustrates an example computer architecture that facilitates performing persona-based analytics operations.

FIG. 8 illustrates an example computer architecture 800 that facilitates performing persona-based analytics operations.

As depicted, computer architecture 800 includes computing resources 821, data lake 802, request processor 803, dashboard formulator 804, and user-interface 806. Tools 822A and 822B and pipelines 823A and 823B are running on computing resources 821. Tools 822A and 822B may be included in one or more pipeline stages.

Figure 9:
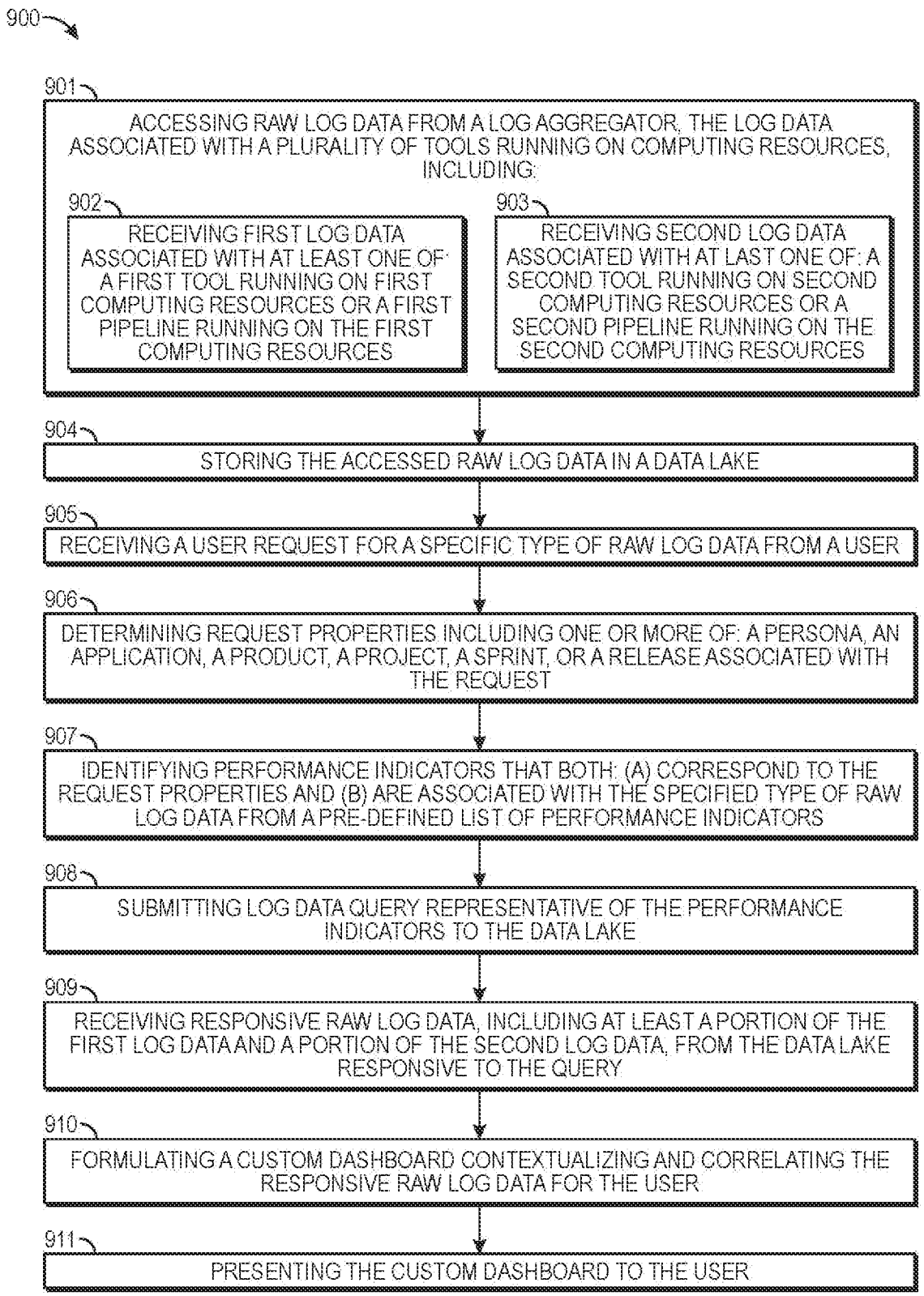
FIG. 9 illustrates a flow chart of an example method for performing persona-based analytics operations.

FIG. 9 illustrates a flow chart of an example method 900 for performing persona-based analytics operations. Method 900 will be described with respect to the components and data in computer architecture 800.

Method 900 includes accessing raw log data from a log aggregator, the log data associated with a plurality of tools running on computing resources (901). Accessing raw log data from a log aggregator includes receiving first log data associated with at least one of: a first tool running on first computing resources or a first pipeline running on the first computing resources (902). Accessing raw log data from a log aggregator includes receiving second log data associated with at last one of: a second tool running on second computing resources or a second pipeline running on the second computing resources (903). Method 900 includes storing the accessed raw log data in a data lake (904). For example, a log aggregator can receive raw log data 811A and raw log data 811B from tools and/or pipelines running on computing resources 821. The log aggregator can store raw log data 811A and raw log data 811B in data lake 802.

Tools running on computing resources 821 can be included in different pipelines and/or different pipeline stages. Data lake 802 can receive data associated with different tools and/or pipelines. Different pipelines (or stages thereof) can run serially or in parallel. Pipelines can also have parent/child relationships. Tools (whether in the same pipeline or different pipelines) can run on a combination of cloud resources and/or on-premise resources. Data lake 802 can store aggregated log data from tools run on a combination of cloud resources and/or on-premise resources.

Method 900 includes receiving a user request for a specific type of raw log data from a user (905). For example, request processor 803 can receive request 814, including properties 815 and data type 816. In one aspect, data type 816 indicates a data type from among: planning, pipeline, quality, security, operations, source code, or customer success.

Method 900 includes determining request properties including one or more of: a persona, an application, a product, a project, a sprint, or a release associated with the request (906). For example, request processor 803 can determine properties 815 of request 814. Determining properties 815 can include determining a persona selected from among developer, manager, or executive.

Method 900 includes identifying performance indicators (e.g., KPIs) that both: (a) correspond to the request properties and (b) are associated with the specified type of raw log data from a pre-defined list of performance indicators (907). For example, request process 803 can identifier KPIs 817, including KPI 817A and KPI 817B, that both correspond to properties 815 and are associated with data type 816. KPIs can span the dimensions of planning, pipeline, security, quality, operations, source code, and customer success.

In one aspect, identifying performance indicators includes receiving a user selection of one or more Key Performance Indicators (KPIs), for example, via a drag and drop (interface) model.

Method 900 includes submitting log data query representative of the performance indicators to the data lake (908). For example, request processor 803 can send query 812 to data lake 802. Query 812 can be a query representative of KPIs 817.

Method 900 includes receiving responsive raw log data, including at least a portion of the first log data and a portion of the second log data, from the data lake responsive to the query (909). For example, responsive to query 812, request processor 803 can receive raw log data 813 form data lake 802. Raw log data 813 can include at least a portion of raw lag data 811A and at least a portion of raw log data 811B. Request processor 803 can send raw log data 813 to dashboard formulator 804. Dashboard formulator 804 can receive raw log data 813 from request processor 803.

Method 900 includes formulating a custom dashboard contextualizing and correlating the responsive raw log data for the user (910). For example, dashboard formulator 804 can formulate custom dashboard 818 from raw log data 813. Custom dashboard 818 can contextualize and correlate raw log data 813 to the user.

Method 900 includes presenting the custom dashboard to the user (911). For example, dashboard formulator 804 can present custom dashboard 818 at user-interface 806.

In one aspect, custom dashboard 818 is compared to a previously formulated custom dashboard associated with data type 816. Based on the comparison, dashboard formulator 804 (or some other module) can identify (1) a trend in operation of at least one of: a tool and/or pipeline running on computing resources 821 or (2) information related to security, quality, or operational posture of at least one of: a tool and/or pipeline running on computing resources 821.

Deriving Computing Environment Posture

Unified insights and logs can help customers better understand their current DevOps ecosystem security and compliance score cards automatically using various techniques. Using a security and compliance framework, customers can automatically validate controls against the current environment and get a report with score card and the current posture level (basic, intermediate and advanced). Results can be generated using an automatic process. Controls can be checked against customer DevOps ecosystem using the pipeline workflows, logs from various tools and pipelines, build blueprints, API connectors and tool registry. Controls can be validated in multiple various dimensions and capabilities including developers, operations, quality and security). Based on validation output, scorecard against the customer DevOps environment can be generated.

Various different controls can used, including any of the following: authentication, authorization, identity, Infrastructure security controls, encryption, configuration changes, log management, user privileges, vulnerabilities, certificates, clear text passwords, Inventory of tools/assets, data recovery, monitoring and alerting, security access to the environment, static code analysis, quality and security gates and thresholds and incident response capabilities.

Figure 10:
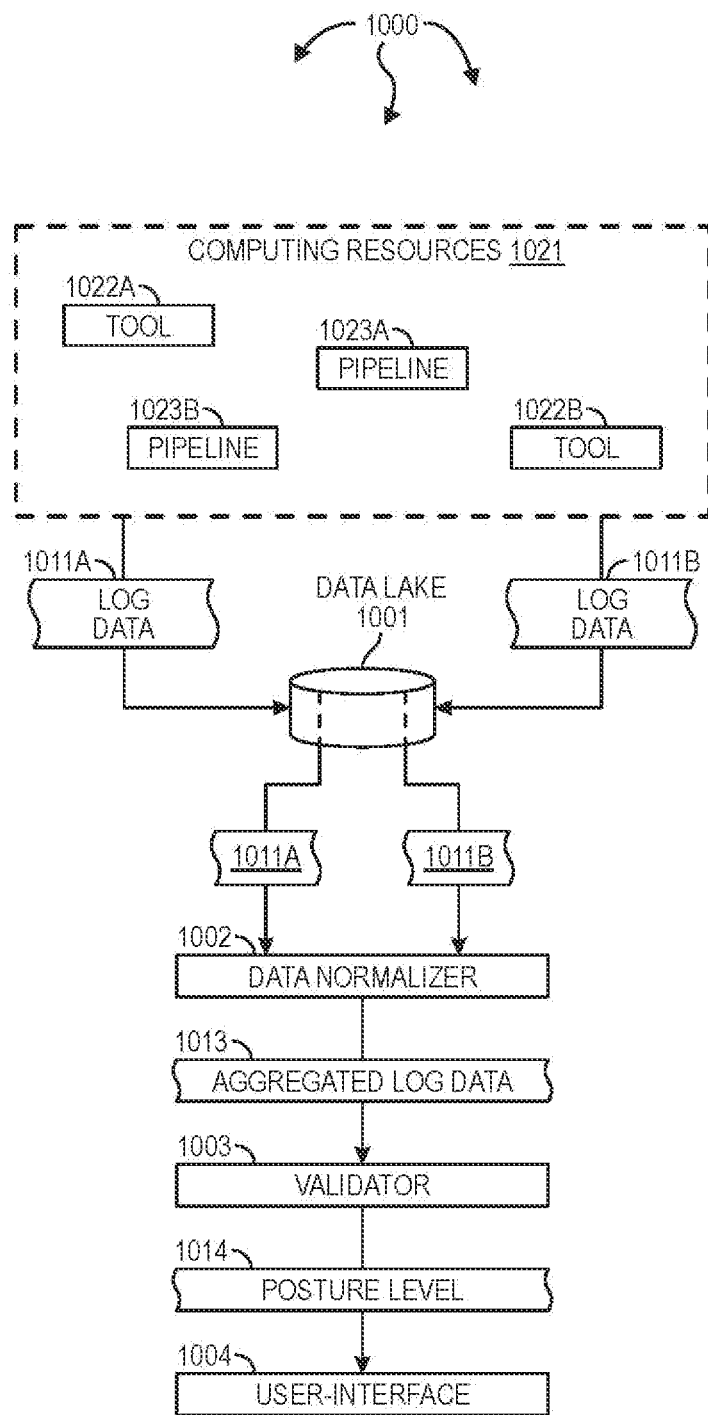
FIG. 10 illustrates an example computer architecture that facilitates determining a computing environment posture level.

FIG. 10 illustrates an example computer architecture 1000 that facilitates determining a computing environment posture level.

As depicted, computer architecture 1000 includes computing resources 1021, data lake 1001, data normalizer 1002, validator 1003, and user-interface 1004. Tools 1022A and 1022B and pipelines 1023A and 1023B are running on computing resources 1021. Tools 1022A and 1022B may be included in one or more pipeline stages.

Figure 11:
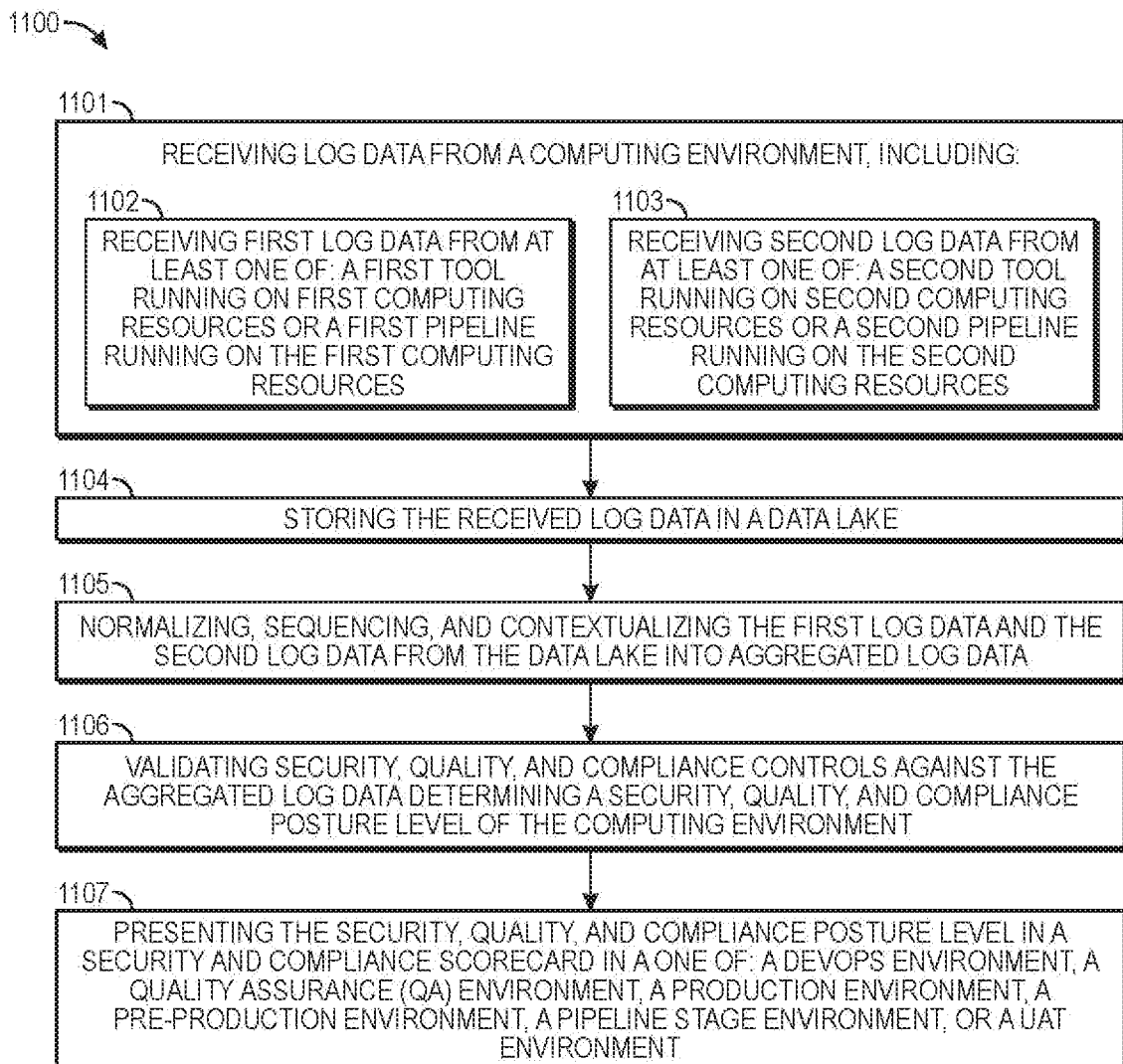
FIG. 11 illustrates a flow chart of an example method for determining a computing environment posture level

FIG. 11 illustrates a flow chart of an example method 1100 for determining a computing environment posture level. Method 1100 will be described with respect to the components and data in computer architecture 1000.

Method 1100 includes receiving log data from a computing environment (1101). Receiving log data from a computing environment includes receiving first log data from at least one of: a first tool running on first computing resources or a first pipeline running on the first computing resources (1102). Receiving log data from a computing environment includes receiving second log data from at least one of: a second tool running on second computing resources or a second pipeline running on the second computing resources (1103). Method 1100 includes storing the received log data in a data lake (1104). For example, a log aggregator can receive raw log data 1011A and raw log data 1011B from tools and/or pipelines running on computing resources 1021. The log aggregator can store raw log data 1011A and raw log data 1011B in data lake 1001.

Tools running on computing resources 1021 can be included in different pipelines and/or pipelines stages. Data lake 1001 can receive data associated with different tools and/or pipelines. Different pipelines (or stages thereof) can run serially or in parallel. Pipelines can also have parent/child relationships. Tools (whether in the same pipeline or different pipelines) can run on a combination of cloud resources and/or on-premise resources. Data lake 1001 can access pipeline data from tools run on a combination of cloud resources and/or on-premise resources.

Method 1100 includes normalizing, sequencing, and contextualizing the first log data and the second log data from the data lake into aggregated log data (1105). For example, data normalizer 1002 can access raw log data 1011A and raw log data 1011B from data lake 1001. Data normalizer 1002 can normalize, sequence, and contextualize raw log data 1011A and raw log data 1011B into aggregated log data 1013. Data normalizer can send aggregated log data 1013 to validator 1003. Validator 1003 can receive aggregated log data 1013 from data normalizer 1002.

Method 1100 includes validating security, quality, and compliance controls against the aggregated log data determining a security, quality, and compliance posture level of the computing environment (1106). For example, validator 1003 can validate security, quality, and compliance controls against aggregated log data 1013 determining posture level 1014 of computing environment 1012.

In one aspect, 1106 includes checking the security, quality, and compliance controls against a customer DevOps ecosystem (e.g., 204 or 404) using one or more of: pipeline workflows, aggregated log data 1013, build manifests (e.g., 416), API connectors, or a tool registry.

In another aspect, 1106 includes validating one or more security, quality, and compliance controls selected from among controls related to one or more of: authentication, authorization, identity, infrastructure security controls, encryption, configuration changes, log management, user privileges, vulnerabilities, certificates, clear text passwords, inventory of tools/assets, data recovery, monitoring and alerting, security access to the environment, static code analysis, dynamic code analysis, container scans, quality gates, security gates, thresholds, and incident response capabilities.

In a further aspect, 1106 includes determining computing environment compliance with one or more government regulations across security, compliance, and quality dimensions. Government regulations can include SOX, PCI, HIPPA, FTC, or FedRAMP In an additional aspect, 1106 includes determining a maturity level of one or more tools (1022A, 1022B, etc.) and/or one or more pipelines (1023A, 1023B, etc.) from among: beginner, intermediate, or advanced.

In another further aspect, 1106 includes: (1) identifying a gap in one or more tools (1022A, 1022B, etc.) and/or one or more pipelines (1023A, 1023B, etc.) or (2) identifying an improvement that can be made to one or more tools (1022A, 1022B, etc.) and/or one or more pipelines (1023A, 1023B, etc.)

Method 1100 includes presenting the security, quality, and compliance posture level in a security and compliance scorecard in a one of: a DevOps environment, a quality assurance (QA) environment, a production environment, a pre-production environment, a pipeline stage environment, or a UAT environment (1107). For example, validator 1003 can present posture level 1014 at user-interface 1004. Presenting the security, quality, and compliance posture can include one or more of: (1) presenting a maturity level (e.g., beginner, intermediate, or advanced) of one or more tools (1022A, 1022B, etc.) and/or one or more pipelines (1023A, 1023B, etc.), (2) presenting an improvement that can be made to one or more tools (1022A, 1022B, etc.) and/or one or more pipelines (1023A, 1023B, etc.), or (3) presenting the gap in one or more tools (1022A, 1022B, etc.) and/or one or more pipelines (1023A, 1023B, etc.)

Other Aspects

Figure 12:
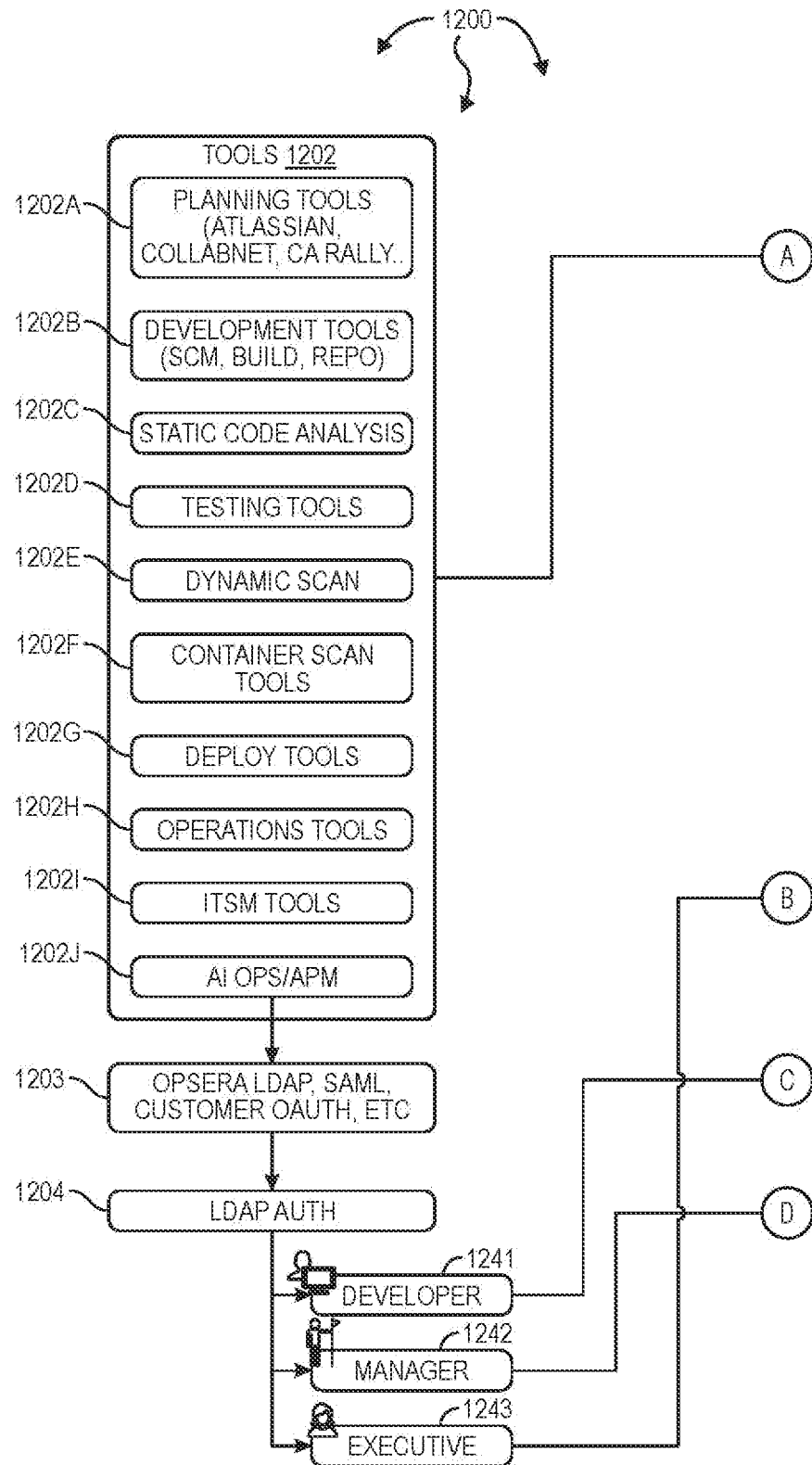
FIG. 12 illustrates an example computer architecture and flow of processing log data.
Figure 12:
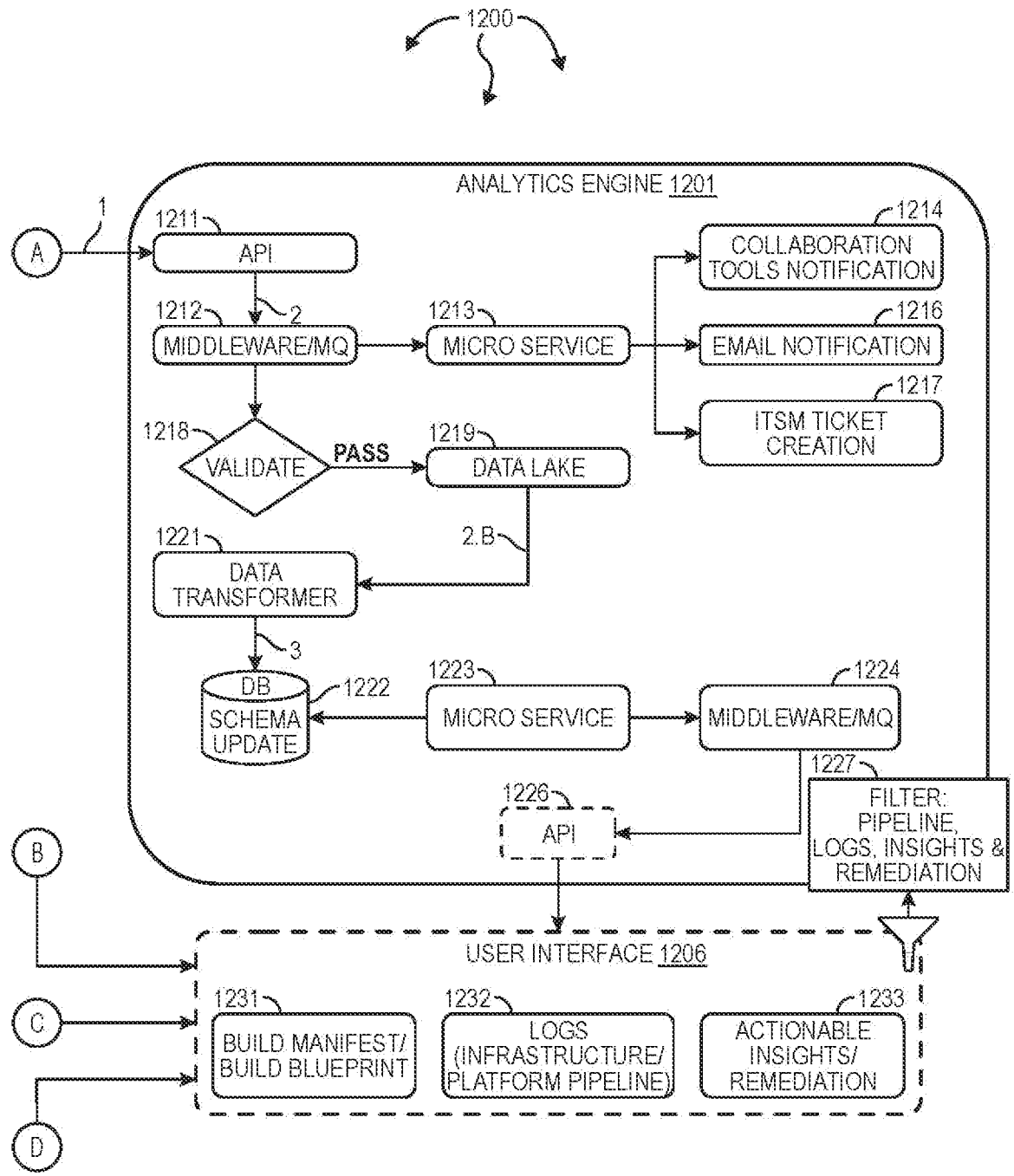

FIG. 12 illustrates an example architecture and flow 1200 of processing log data.

Analytics engine 1201 includes API 1211, middleware 1212, micro service 1213, collaboration tools notification 1214, email notification 1216, ITSM tick creation 1217, validate 1218, data lake 1219, data transformer 1221, DB schema update 1222, micro service 1223, middleware 1224, API 1226, and filters 1227. In general, analytics engine 1201 can handle unified insights in DevSecOps space across planning, source code, pipeline, quality, security, and operations.

Analytics engine 1201 can be connected to any DevOps tools that starts from source code management, Build, Testing, Security, Deploy, Planning tools and IT service management tools for unified insights. For example, in flow 1200, analytics engine 1201 is connected to tools 1202. Tools 1202 include planning tools 1202A, development tools 1202B, static code analysis 1202C, testing tools 1202D, dynamic scan 1202E, container scan tools 1202F, deploy tools 1202G, operations tools 1202H, ITSM tools 1202I, and AL Ops/PM 1202.1. Tools 1202 are connected to analytics engine 1201. Tools 1202 can emit log data and/or metadata to analytics engine 1201.

Analytics engine 1201 is further connected to user interface 1206. User interface 1206 includes build manifest/build blue print 1231, logs 1232, actionable insights/remediation 1233.

Lightweight Directory Access Protocol (LDAP) integration can provide Role based access for users who can be classified as, engineer, Quality engineers, Security engineers, Managers, Executives etc. For example, users can log in using Lightweight LDAP, Security Assertion Markup Language (SAML), customer Oauth, etc. 1203. LDAP Auth Service 1204 can validate users who login with the right LDAP group and provide them the access they are intended to access, such as, for example, developer 1241, manager 1242, or executive 1243.

In general, Application Programming Interfaces (APIs) 1211 and 1226 connect with tools and internal services, for example, to post messages to or consume data from another service or service layer. For example, API 1211 connects tools 1202 and analytics engine 1201. Log data and/or metadata emitted from tools 1202 can be received at API 1211. Similarly, API 1226 connects user interface 1206 and analytics engine 1201. Analytics engine 1201 can used API 1226 to send logs, insights, notifications, etc. to user interface 1206

Middleware 1212 (e.g., Kafka) can queue messages and post messages multiple times or post messages to multiple services at the same time. Micro service 1213 (a java based service) can be used to connect a node layer to end point tools and take action accordingly based on a node layer call.

User notifications can be sent using any of a variety of collaboration tools 1214 including email 1216, Slack, MS Teams, pager duty Jira tools, ITSM ticket creation 1217, etc. to create a ticket or update the user based on the threshold set up by the portal user for a tool or pipeline or unified insights KPI's. Notifications can be set by the user for a pipeline or tool or insights based on the metadata or a threshold. Microservice 1213 can interoperation with ITSM tools or incident management systems to create tickets Validate 1218 can validate log/metadata types are in an appropriate format before pushing log/metadata to data lake 1219. Data lake 1219 is a repository for raw data collected from tools and platforms (e.g., any of tools 1202). Using scalable and dynamic index management, data lake 1219 can segregate data into respective indices which can be searched and queried via data transformer 1221. Data lake 1219 can preserve raw data for audit and compliance purposes.

Data transformer 1221 can normalize and serialize raw data from data lake 1219 into a schema used for analytics. Data transformer 1221 can convert raw into calculated metric values improving query processing time from a presentation layer and reducing the need for repeated calculations. Data transformer 1221 can also help present malformed data from entering databases facilitating more efficient and effective end to end analytics flow.

DB (database) schema update 1222 can include schema for various categories of tools including Software Configuration Management (SCM), build, deploy, Quality, Security, Planning, operations and ITSM tools. Unified insights can be offered across all of the various categories and can be filtered based on different tool vendors with various filter options in the UI.

Micro service 1223 (a java based service) can be used to connect a node layer to end point tools and take action accordingly based on a node layer call. Middleware 1224 (e.g., Kafka) can queue messages and post messages multiple times or post messages to multiple services at the same time.

Filters 1227 can be used to filter data based on tools, persona, time filter, Feature, release, organization level, etc. in UI for users to filter results based on their needs.

User interface 1206 can be used for Tool chain automation, Pipeline and Unified insights, notifications, etc. In one aspect, user interface 1206 is built on React JS. User interface 1206 can also present any of build manifest/build blue print 1231, logs 1232, actionable insights/remediation 1233.

Build manifest/build blue print 1231 can provide unique log analysis, essentially providing logs with each activity for automated and manual tasks from tools and used as part of a pipeline. Build manifest/build blue print 1231 can be automated and sent to S3 bucket or Jira ticket or as an PDF which can be later used for audit and compliance purposes and also for troubleshooting purposes during and after the deployment.

Logs 1232 can include tools & pipeline metadata that is parsed through and/or generated by a pipeline or tool. Logs 1232 can be shown at user interface 1206 to any user having access (e.g., based on Role-Based Access Control (RBAC)), for example, developer 1241, manager 1242, executive 1243, etc. Logs 1232 can used for trouble shooting and communication Actionable insights/remediation 1233 take any type of raw data as part of the Pipeline (SFDC, SDLC, Package deployments, DB deployments or Infrastructure provisioning, Infrastructure deployments, etc.) and provide contextualization and insights to executives to managers and developers/operations team on how well their DevOps ecosystem is working right from Planning to production deployment with zero coding.

Figure 13:
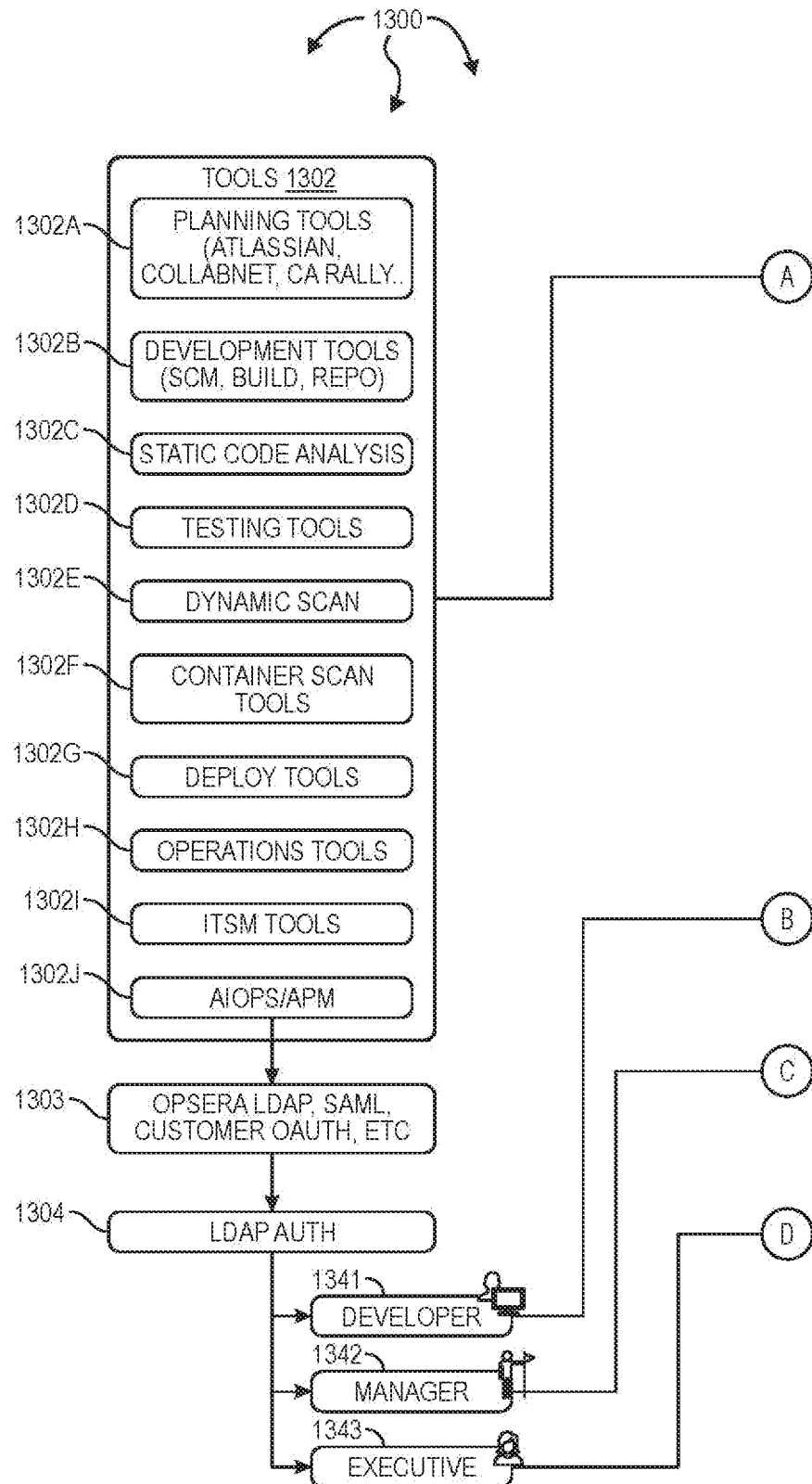
FIG. 13 illustrates an example computer architecture and flow of deriving an insight into computer environment operations.
Figure 13:
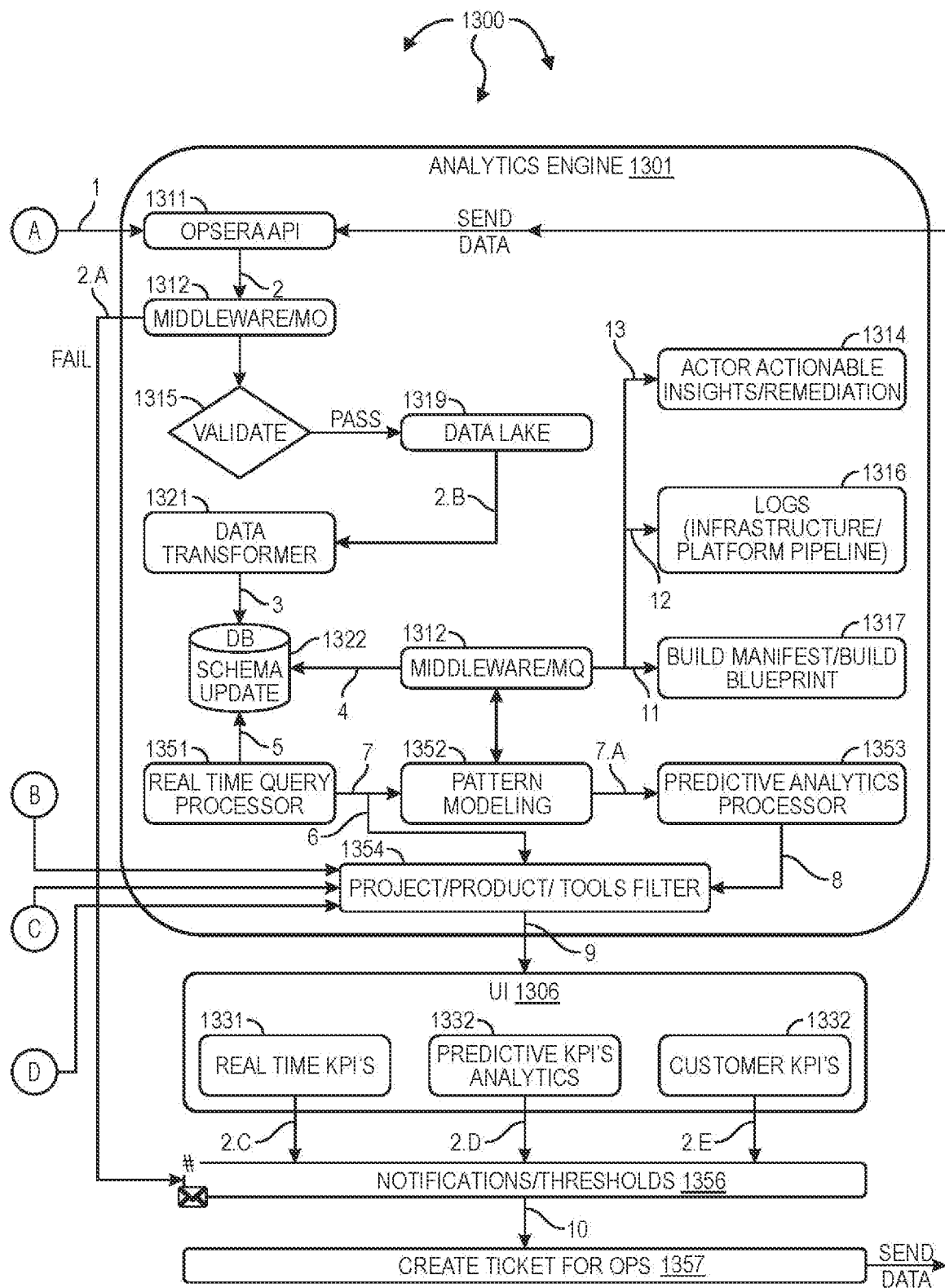

FIG. 13 illustrates an example architecture and flow 1300 of deriving an insight into computer environment operations.

Analytics engine 1301 includes API 1311, middleware 1312, actionable insights/remediation 1314, logs 1316, Build manifest/build blue print 1317, validate 1319, data lake 1219, data transformer 1321, DB schema update 1322, middleware 1324, real time query processor 1351, pattern modeling 1352, predictive analytics processor 1353, and project/product/tools filter 1354. In general, analytics engine 1301 can handle unified insights in DevSecOps space across planning, source code, pipeline, quality, security, and operations.

Analytics engine 1301 can be connected to any DevOps tools that starts from source code management, Build, Testing, Security, Deploy, Planning tools and IT service management tools for unified insights. For example, in flow 1300, analytics engine 1301 is connected to tools 1302. Tools 1302 include planning tools 1302A, development tools 1302B, static code analysis 1302C, testing tools 1302D, dynamic scan 1302E, container scan tools 1302F, deploy tools 1302G, operations tools 1302H, ITSM tools 1302I, and AL Ops/PM 1302.1. Tools 1302 are connected to analytics engine 1301. Tools 1302 can emit log data and/or metadata to analytics engine 1301.

Analytics engine 1301 is further connected to user interface 1306, notifications/thresholds 136, and create ticket for ops 1357. User interface 1206 includes real time KPIs 1331, predictive KPIs analytics 1332, and customer KPIs 1333.

Lightweight Directory Access Protocol (LDAP) integration can provide Role based access for users who can be classified as, engineer, Quality engineers, Security engineers, Managers, Executives etc. For example, users can log in using Lightweight LDAP, Security Assertion Markup Language (SAML), customer Oauth, etc. 1303. LDAP Auth Service 1304 can validate users who login with the right LDAP group and provide them the access they are intended to access, such as, for example, developer 1341, manager 1342, or executive 1243.

In general, Application Programming Interface (APIs) 1311 connects with tools and internal services, for example, to post messages to or consume data from another service or service layer. For example, API 1311 connects tools 1302 and analytics engine 1301. Log data and/or metadata emitted from tools 1302 can be received at API 1311.

Middleware 1312 (e.g., Kafka) can queue messages and post messages multiple times or post messages to multiple services at the same time.

Validate 1318 can validate log/metadata types are in an appropriate format before pushing log/metadata to data lake 1319. Data lake 1319 is a repository for raw data collected from tools and platforms (e.g., any of tools 1302). Using scalable and dynamic index management, data lake 1319 can segregate data into respective indices which can be searched and queried via data transformer 1321. Data lake 1319 can preserve raw data for audit and compliance purposes.

Data transformer 1321 can normalize and serialize raw data from data lake 1319 into a schema used for analytics. Data transformer 1321 can convert raw into calculated metric values improving query processing time from a presentation layer and reducing the need for repeated calculations. Data transformer 1321 can also help present malformed data from entering databases facilitating more efficient and effective end to end analytics flow.

DB schema update 1322 can include schema for various categories of tools including Software Configuration Management (SCM), build, deploy, Quality, Security, Planning, operations and ITSM tools. Unified insights can be offered across all of the various categories and can be filtered based on different tool vendors with various filter options in the UI.

Middleware 1324 (e.g., Kafka) can queue messages and post messages multiple times or post messages to multiple services at the same time.

Actionable insights/remediation 1233 take any type of raw data as part of the Pipeline (SFDC, SDLC, Package deployments, DB (database) deployments or Infrastructure provisioning, Infrastructure deployments, etc.) and provide contextualization and insights to executives to managers and developers/operations team on how well their DevOps ecosystem is working right from Planning to production deployment with zero coding.

Logs 1316 can include tools & pipeline metadata that is parsed through and/or generated by a pipeline or tool. Logs 1316 can be utilized by analytics engine 1301 for any user having access (e.g., based on Role-Based Access Control (RBAC)), for example, developer 1241, manager 1242, executive 1243, etc. Logs 1316 can used for trouble shooting and communication Build manifest/build blueprint 1317 can provide unique log analysis, essentially providing logs with each step for automated and manual tasks from the tools and system that is used as part of the pipeline. These build manifests can be automated and sent to S3 bucket or Jira ticket or as an PDF which can be later used for audit and compliance purposes and also for troubleshooting purposes during and after the deployment.

Real time query processor 1351 allows for metrics to be displayed at user interface 1306 with minimal delay in updating visualizations. Metrics can relate to distinct dimensions (Planning, Development, Security, Operations) that span across numerous (e.g., 100+) KPI's. Real time query processor 1351 allows users to track the metrics across these dimensions in a real time manner. (such as tracking the progress of their pipelines as they are running. In addition, logs for tool activity should be captured in real-time as well). Real time query processor 1351 allows users to see the results of their daily operations as they occur, so that if there any issues or anomalies in the activity, they can be identified and resolved.

Pattern modelling 1352 is used to create models to provide predictive insights to customers regarding their user patterns, tools patterns, pipelines/operations metadata, etc. Using log/metadata emitted from tools 1302, pattern modelling 1352 can construct data streaming models to give predictive trends/insights across users, tools, pipelines, operations, and planning insights. Pattern modelling 1352 can derive models that provide predictive analytics to customers. Model derivation can be relatively complex generating models providing more meaningful analysis/analytics of user systems.

Predictive analytics processor 1353 provides insights on when and in what particular scenario a (e.g., high or critical) error is triggered in an infrastructure or application during the application deployment flow.

Filters 1354 can be used to filter data based on tools, persona, time filter, Feature, release, organization level, etc. in UI for users to filter results based on their needs.

Real Time KPIs 1331 can be output from real time query processor 1351.

Predictive KPI's analytics 1332 can be output from predictive analytics processor 1353 executing a model derived by pattern modeler 1352.

Custom KPIs 1333 can be customer created KPI's relevant to tools/pipelines used by the customer.

Notifications/thresholds 1356 allows users to receive alerts on the pipeline activity for complete, on error, or on all activity in the pipeline. Notifications/thresholds 1356 also allow users to build approval notifications for the pipeline for approval or denial status. Users can set notifications for specific logs that need to be monitored as part of a pipeline or analytics module to help prevent any incidents or failures. Notifications can be sent via email, Slack, HipChat, Microsoft Teams or as an SMS.

An ITSM microservice can create 1357 incident management or service ticket to Information technology Service Management (ITSM) tools like Jira or Service now.

Figure 14:
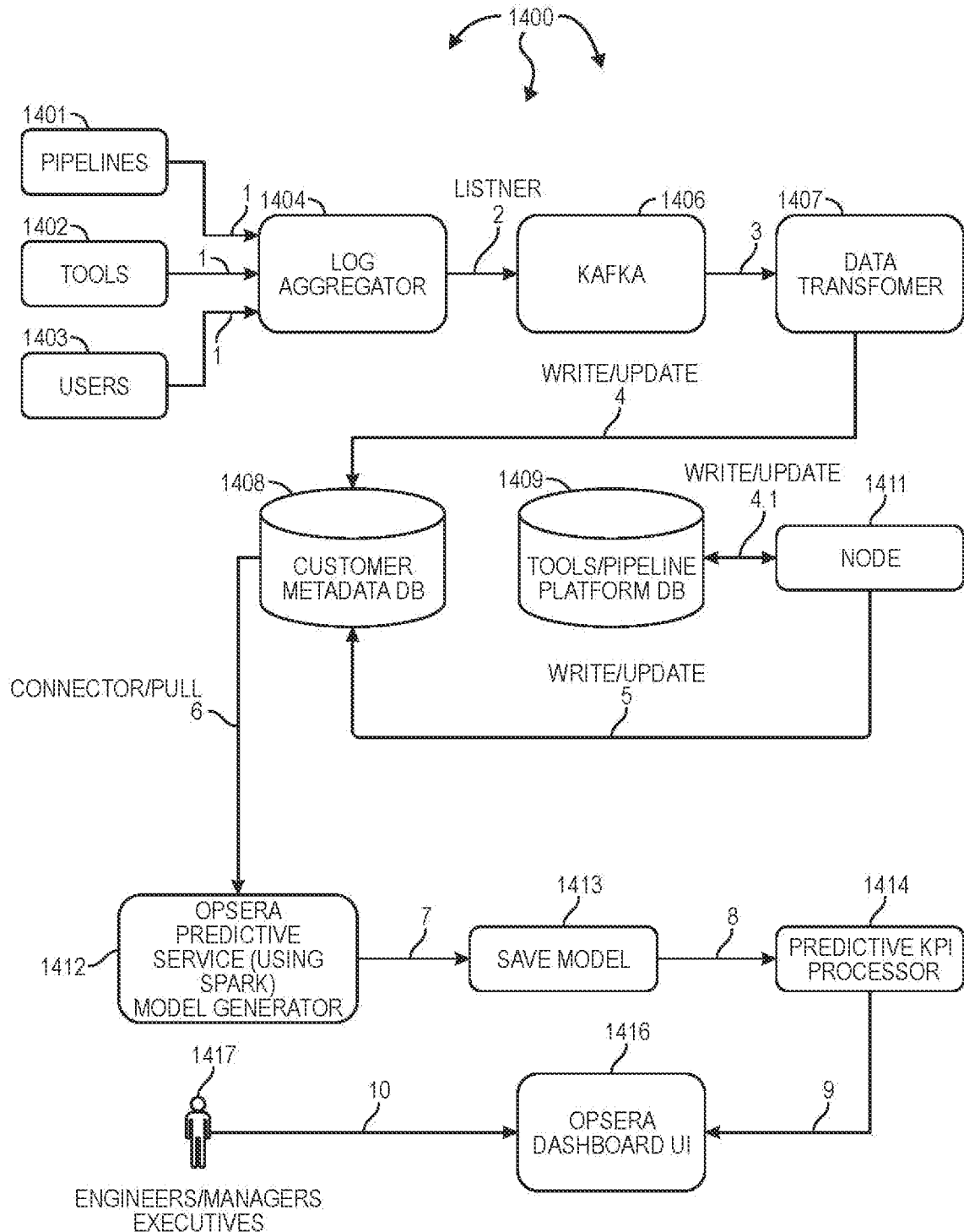
FIG. 14 illustrates an example computer architecture and flow of predicting an insight into computer environment operations.

FIG. 14 illustrates an example architecture and flow 1400 of predicting an insight into computer environment operations.

Pipelines 1401 can include a plurality of DevOps tools stitched together from commit code to deploy. Pipeline 1401 can also be used to process any stage-by-stage process set up by the user for orchestration purposes. Pipelines 1401 can include declarative pipelines.

Tools 1402 can include Dev, QA, Security, Deploy, ITSM and collaboration tools connected for Tool chain automation, pipeline or unified insights.

Users 1403 include persona's with access to unified insights via UI or through API layer, who have authenticated, and are authorized to consume data or pipeline or tool chain automation.

Log aggregator 1404 consumes any metadata from pipelines 1401, tools 1402, users 1403, etc. including any of: Dev, QA, Security, Deploy, Planning and ITSM, collaboration tools. Consumed data can used to provide unified insights after data transformation.

Kafka 1406 is a middle ware service used to queue messages. Kafka 1406 can post a message at multiple times or to multiple services at the same time.

Data transformer 1407 can normalize and serialize raw data from a data lake into a schema used for analytics. Data transformer 1407 can convert raw into calculated metric values improving query processing time from a presentation layer and reducing the need for repeated calculations. Data transformer 1407 can also help present malformed data from entering databases facilitating more efficient and effective end to end analytics flow.

Customer metadata DB 1406 can store any customer data for registration like First name, Last name, email Address, Location, phone number, cloud, etc. A list of tools used by a customer can also be considered customer meta data. A customer can be included in users 1403.

Tools/pipeline platform DB 1409 can store metadata for any of pipelines 1401 and/or tools 1402.

Node 1411 can be Node JS, a Java script API layer, used as an orchestration layer for tool chain automation, pipeline and unified insights.

Predictive service 1412 can provide insights on when and in what particular scenario a (e.g., high or critical) error is triggered in infrastructure or application during the application deployment flow.

Save model 1413 can be used in data modelling whenever a new pattern is identified and is to be used for actionable or predictive insights to inform the user to identify/mitigate failures.

Predictive KPI processor 141 can provide insights on when and in what particular scenario a (e.g., high or critical) error is triggered in infrastructure or application during the application deployment flow.

Operas dashboard UI 1416 can include any of the functionality described with respect to user interfaces 1206 and/or 1306.

Engineers/Managers/Executives can be different persona's set up for accessing pipeline, tool chain automation, and insights. Users/Customers can create multiple persona's apart from the default persona's (Engineers/Managers/Executives).

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations can comprise or utilize a special purpose or general-purpose computer including computer hardware, such as, for example, one or more computer and/or hardware processors (including any of Central Processing Units (CPUs), and/or Graphical Processing Units (GPUs), general-purpose GPUs (GPGPUs), Field Programmable Gate Arrays (FPGAs), application specific integrated circuits (ASICs), Tensor Processing Units (TPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: pipeline data, DevOps data, standardized analytics data, analytics outcomes, log data, normalizer log data, build manifest data, manifests, aggregated log data, user log data, tool log data, pipeline log data, pipeline metadata, analytics log data, data patterns, predictive insight models, predictive insights, raw log data, queries, request properties, request data types, KPIs, custom dashboards, posture levels, notifications, personas, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, pipeline data, DevOps data, standardized analytics data, analytics outcomes, log data, normalizer log data, build manifest data, manifests, aggregated log data, user log data, tool log data, pipeline log data, pipeline metadata, analytics log data, data patterns, predictive insight models, predictive insights, raw log data, queries, request properties, request data types, KPIs, custom dashboards, posture levels, notifications, personas, etc.

Implementations of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, servers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as on premise, private cloud, community cloud, public cloud, hybrid cloud, and so forth. In this description and in the following claims, a "cloud computing environment" is an environment in which cloud computing is employed.

Hybrid cloud deployment models combine portions of other different deployment models, such as, for example, a combination of on-premise and public, a combination of private and public, a combination of two different public cloud deployment models, etc. Thus, resources utilized in a hybrid cloud can span different locations, including on-premise resources, private cloud resources, (e.g., multiple different) public cloud resources, etc.

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

What is claimed:

1. A method comprising:
    executing a pipeline including a first tool and a second tool, the first tool and the second tool being wrapped in a flexible schema model configured to correlate tool-level data from the first tool and the second tool into a pipeline schema;
    receiving pipeline data including: (1) first pipeline data in a first format resulting from execution of a first tool running on first resources, the first pipeline data received through a first API tailored to the first tool and (2) second pipeline data in a second format resulting from execution of a second tool running on second resources, the second pipeline data received through a second API tailored to the second tool, the second format differing from the first format;
    filtering, validating, normalizing, sequencing, contextualizing, and aggregating first DevOps data from the first pipeline data;
    storing the first DevOps data in a data lake in raw form along with a first step summary according to the flexible schema model;
    filtering, validating, normalizing, sequencing, contextualizing, and aggregating second DevOps data from the second pipeline data;
    storing the second DevOps data in the data lake in raw form along with a second step summary according to the flexible schema model;
    aggregating the first DevOps data and the second DevOps data from the data lake into standardized analytics data including normalizing and serializing the first DevOps data and the second DevOps data into in an analytics format compatible with a client analytics environment, wherein normalizing and serializing the first DevOps data and the second DevOps data into in the analytics format comprises converting the first pipeline data and the second pipeline data into the pipeline schema;
    presenting the standardized analytics data in a client DevOps environment providing unified insights into client pipeline operation; and
    performing a client analytics operation using the standardized analytics data.

2. The method of claim 1, wherein receiving first pipeline data and second pipeline data comprises receiving the first pipeline data associated with a first pipeline and receiving second pipeline data associated with a second pipeline running in parallel with the first pipeline.

3. The method of claim 2, wherein normalizing and serializing the first DevOps data and the second DevOps data comprises converting the first pipeline data and the second pipeline data into calculated metric values.

4. The method of claim 1, wherein receiving first pipeline data and second pipeline data comprises receiving the first pipeline data associated with a parent pipeline and receiving the second pipeline data associated with a child pipeline of the parent pipeline.

5. The method of claim 4, wherein normalizing and serializing the first DevOps data and the second DevOps data comprises converting the first pipeline data and the second pipeline data into calculated metric values.

6. The method of claim 1, wherein normalizing and serializing the first DevOps data and the second DevOps data into the analytics format comprises converting the first pipeline data and the second pipeline data into calculated metric values.

7. The method of claim 1, wherein performing a client analytics operation comprises using the standardized analytics data to satisfy one or more of: security, compliance or audit requirements across a DevOps lifecycle.

8. The method of claim 7, wherein using the standardized analytics data comprises crawling the standardized analytics data; and
    wherein providing unified insights into client pipeline operation comprises providing insights with respect to how one or more pipelines are performing against one or more audit requirements.

9. The method of claim 1, wherein performing a client analytics operation comprises indicating one or more of: engineering contribution value to a client strategy, developer contribution value to the client strategy, or operations contribution value to the client strategy.

10. The method of claim 1, wherein performing a client analytics operation comprises determining a security posture of at least one of the first tool or the second tool.

11. The method of claim 1, wherein presenting the standardized analytics data comprises presenting the standardized analytics data by one or more of: product, application, release, project, spring, or family of products.

12. The method of claim 1, wherein presenting the standardized analytics data comprises presenting the standardized analytics data in a dashboard or log.

13. The method of claim 1, wherein performing a client analytics operation comprises using Key Performance Indicators (KPIs) to evaluate a client security posture.

14. The method of claim 13, wherein using Key Performance Indicators (KPIs) comprises using Key Performance Indicators (KPIs) across the one more dimensions selected from among: planning, pipeline, security, quality, operations, source code, and customer success.

15. The method of claim 1, further comprising using tool chain automation to declare the pipeline including the first tool and the second tool;
    wherein accessing pipeline data comprises accessing pipeline data from the pipeline.

16. The method of claim 1, further comprising connecting to a client DevOps environment that includes a client pipeline; and
    wherein accessing pipeline data comprises accessing pipeline data from the client pipeline.

17. The method of claim 1, wherein accessing pipeline data comprises accessing the first pipeline data from the first tool running on cloud resources and accessing the second pipeline data from the second tool running on one of: cloud resources or on-premise resources.

18. The method of claim 1, wherein accessing pipeline data comprises accessing the first pipeline data from the first tool running on on-premise resources and accessing the second pipeline data from the second tool running on one of: cloud resources or on-premise resources.

19. A system comprising:
    a processor;
    system memory coupled to the processor and storing instructions configured to cause the processor to:

executing a pipeline including a first tool and a second tool, the first tool and the second tool being wrapped in a flexible schema model configured to correlate tool-level data from the first tool and the second tool into a pipeline schema;

receive pipeline data including: (1) first pipeline data in a first format from a first tool running on first resources through a first API tailored to the first tool and (2) second pipeline data in a second format from a second tool running on second resources through a second API tailored to the second tool, the second format differing from the first format;

filter, validate, normalize, sequence, contextualize, and aggregate first DevOps data from the first pipeline data;

store the first DevOps data in a data lake in raw form along with a first step summary according to the flexible schema model;

filter, validate, normalize, sequence, contextualize, and aggregate second DevOps data from the second pipeline data;

store the second DevOps data in the data lake in raw form along with a second step summary according to the flexible schema model;

aggregate the first DevOps data and the second DevOps data from the data lake into standardized analytics data including normalizing and serializing the first DevOps data and the second DevOps data into in an analytics format compatible with a client analytics environment, wherein normalizing and serializing the first DevOps data and the second DevOps data into in the analytics format comprises converting the first pipeline data and the second pipeline data into the pipeline schema;

present the standardized analytics data in a client DevOps environment providing unified insights into client pipeline operation; and perform a client analytics operation using the standardized analytics data.

\* \* \* \* \*